(12) United States Patent
Kang et al.

(10) Patent No.: US 11,873,828 B2
(45) Date of Patent: Jan. 16, 2024

(54) CEILING FAN INCLUDING A COMMUNICATION MODULE AND A CONTROLLER AND METHOD FOR CONTROLLING THE SAME

(71) Applicant: LG ELECTRONICS INC., Seoul (KR)

(72) Inventors: Seunghyuck Kang, Seoul (KR); Seulki Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 559 days.

(21) Appl. No.: 17/058,075

(22) PCT Filed: Jun. 12, 2019

(86) PCT No.: PCT/KR2019/007108
§ 371 (c)(1),
(2) Date: Nov. 23, 2020

(87) PCT Pub. No.: WO2019/240502
PCT Pub. Date: Dec. 19, 2019

(65) Prior Publication Data
US 2021/0215163 A1    Jul. 15, 2021

(30) Foreign Application Priority Data

Jun. 12, 2018   (KR) .................. 10-2018-0067501
Jun. 12, 2019   (KR) .................. 10-2019-0069405

(51) Int. Cl.
*F04D 27/00*   (2006.01)
*F04D 25/08*   (2006.01)
(Continued)

(52) U.S. Cl.
CPC ......... *F04D 27/004* (2013.01); *F04D 25/088* (2013.01); *F04D 27/001* (2013.01); *F04D 29/053* (2013.01); *G05B 15/02* (2013.01)

(58) Field of Classification Search
CPC .... F04D 27/004; F04D 25/088; F04D 27/001; F04D 29/053; F04D 29/682;
(Continued)

(56) References Cited

U.S. PATENT DOCUMENTS

2005/0277381 A1   12/2005   Banerjee et al.
2007/0139884 A1    6/2007   Foster, Sr. et al.
(Continued)

FOREIGN PATENT DOCUMENTS

JP         07174375 A    7/1995
JP       2001074283 A    3/2001
(Continued)

*Primary Examiner* — Mohammad Ali
*Assistant Examiner* — Saad M Kabir
(74) *Attorney, Agent, or Firm* — Bryan Cave Leighton Paisner LLP

(57) ABSTRACT

A ceiling fan according to an embodiment of the present disclosure comprises: a shaft coupled onto a ceiling or a wall surface of an indoor space; a motor assembly connected to the shaft to provide rotational power; a plurality of blades coupled to the motor assembly to be rotated; and an electronic component unit coupled to the shaft and positioned in an inner space of the motor assembly, wherein the electronic component unit includes a communication module for interworking with an air conditioning product installed in the indoor space, and a control unit for controlling the air conditioning product and the for assembly.

18 Claims, 10 Drawing Sheets

(51) Int. Cl.
  *F04D 29/053* (2006.01)
  *G05B 15/02* (2006.01)
(58) Field of Classification Search
  CPC ...... F04D 29/684; F04D 25/166; F04D 27/00;
    G05B 15/02; F24F 11/0001; F24F 11/77;
    F24F 11/58; F24F 11/70; F24F 2110/10;
    F24F 2110/20; F24F 2110/64; F24F
    11/56; Y02B 30/70
  USPC ......................................................... 700/276
  See application file for complete search history.

(56) References Cited

U.S. PATENT DOCUMENTS

| | | |
|---|---|---|
| 2014/0023507 A1 | 1/2014 | Smith et al. |
| 2017/0142249 A1 | 5/2017 | Shinar |
| 2017/0159956 A1 | 6/2017 | Lewis et al. |
| 2018/0119973 A1 | 5/2018 | Rothman et al. |
| 2018/0123818 A1 | 5/2018 | Shinar |
| 2018/0306452 A1* | 10/2018 | Kim ...................... F24F 1/0073 |

FOREIGN PATENT DOCUMENTS

| | | |
|---|---|---|
| WO | 2016109645 A1 | 7/2016 |
| WO | 2017183083 A1 | 10/2017 |

\* cited by examiner

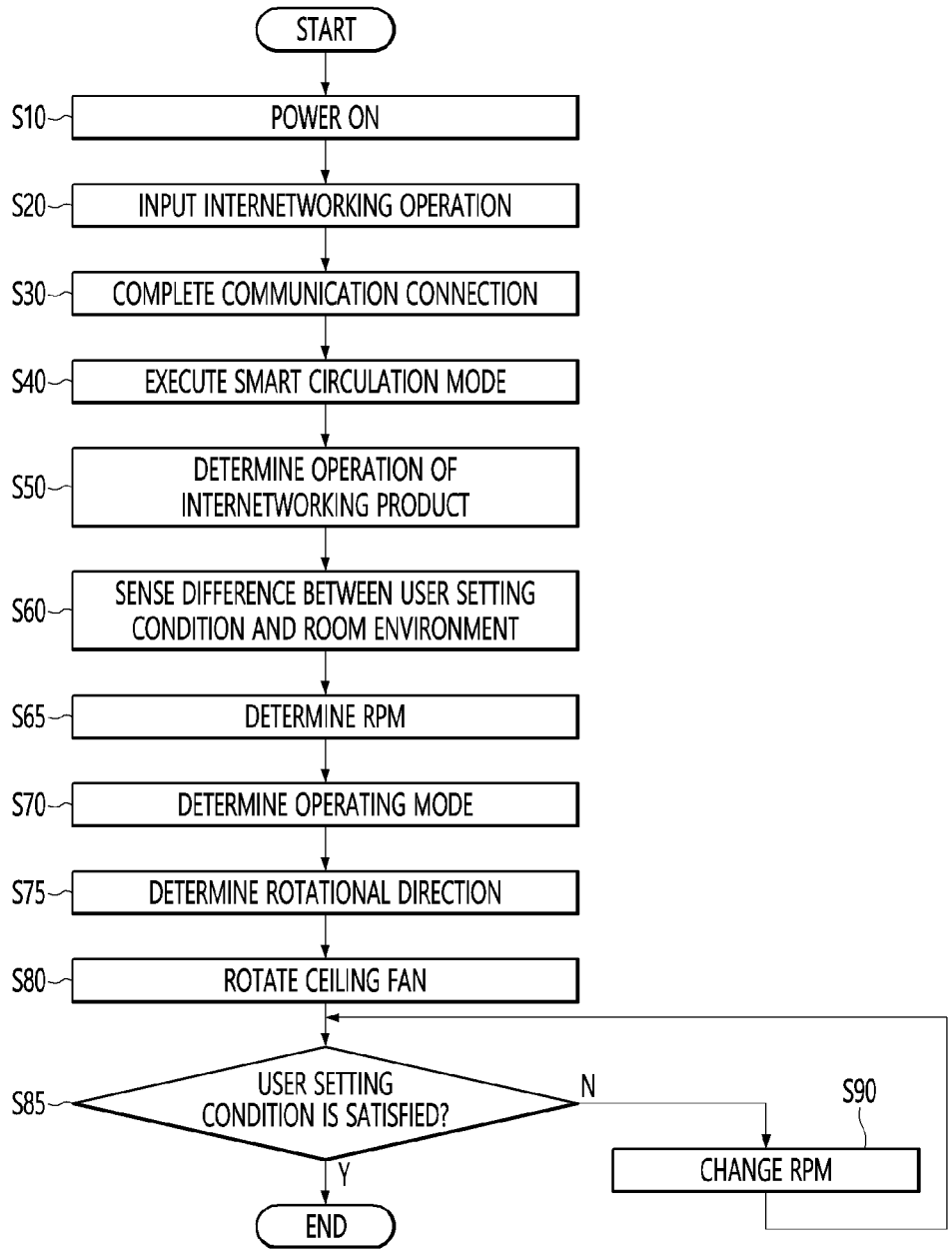

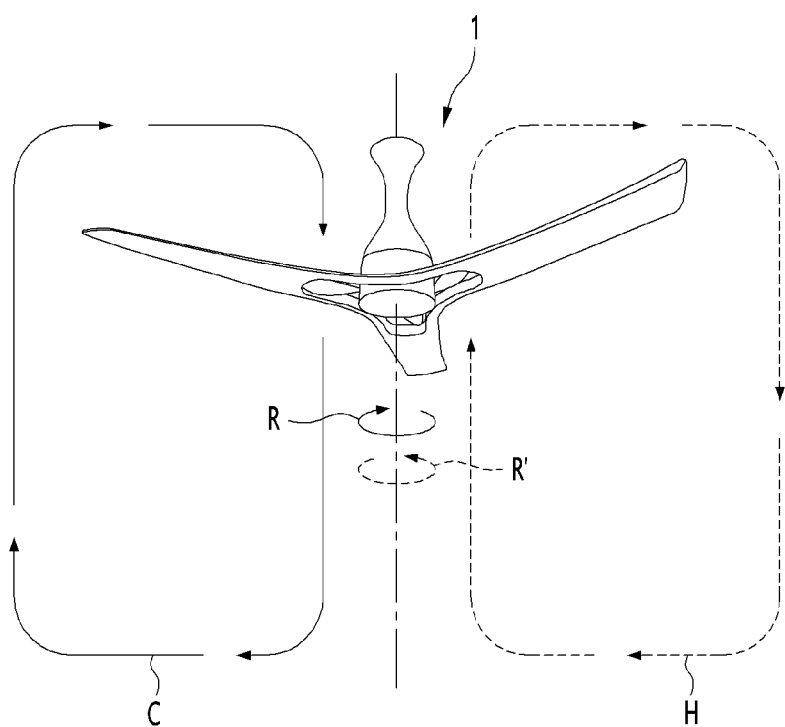

CEILING FAN INCLUDING A COMMUNICATION MODULE AND A CONTROLLER AND METHOD FOR CONTROLLING THE SAME

CROSS-REFERENCE TO RELATED APPLICATIONS

This application is the National Phase of PCT International Application No. PCT/KR2019/007108, filed on Jun. 12, 2019, which claims priority to Korean Patent Application No. 10-2019-0069405, filed on Jun. 12, 2019 and Korean Patent Application No. 10-2018-0067501, filed Jun. 12, 2018, the entire contents of which is hereby incorporated by reference in its entirety.

TECHNICAL FIELD

The present disclosure relates to a ceiling fan and a method for controlling.

BACKGROUND ART

A flow generating device refers to a device which drives a fan to generate airflow and to provide the generated airflow to a user. Such a flow generating device is usually called a fan.

The flow generating device may be variously classified depending on a flow generation manner, a function, an installation manner, and the like. A device, which is installed on a wall surface or a ceiling, of the flow generating device to generate an airflow is called a ceiling fan.

The ceiling fan has been widely used in homes or malls because the ceiling fan may provide economic advantages to the user as the ceiling fan requires power less than an air conditioner or a general fan.

Generally, the ceiling fan includes a drive motor to provide power and a plurality of blades connected to a shaft of the drive motor.

The ceiling fan may circulate air in a room by using wind generated by the rotation of the blades. Accordingly, the ceiling fan may lower or raise the room temperature.

The ceiling fan differs from a conventional flow generating device which is disposed on the ground surface to be erected to concentrate the airflow in a local space. In detail, the ceiling fan may be positioned on the ceiling higher than a user to force air to flow in a larger volume.

Therefore, the ceiling fan may circulate the air in the entire room to uniformly make the temperature distribution in the room, thereby providing the sense of comfort to the user.

Information on the prior art will be described as follows.
Publication No. (Published Date): US Patent Application Publication No. US 2017/0218962 A1 (Aug. 3, 2017)

DISCLOSURE

Technical Problem

The present disclosure is to provide a ceiling fan capable of representing air circulation performance more improved than a conventional ceiling fan, and a method for controlling the same.

The present disclosure is to provide a ceiling fan capable of resolving the stagnation of airflow generated in a partial room space, and a method for controlling the same.

The present disclosure is to provide a ceiling fan capable of operating while internetworking with air conditioning products installed in the room, and a method for controlling the same.

The present disclosure is to provide a ceiling fan capable of integrally and overall performing air conditioning by internetworking with air conditioning products installed in the room, and a method for controlling the same.

The present disclosure is to provide a ceiling fan capable of cooling or warming efficiency, and a method for controlling the same.

The present disclosure is to provide a ceiling fan capable of improving the operating efficiency by internetworking with cooling and warming appliances, and a method for controlling the same.

Technical Solution

According to an embodiment of the present disclosure, a ceiling fan may include a shaft coupled to a ceiling or a wall surface in a room, a motor assembly connected with the shaft to provide rotational power, a plurality of blades coupled to the motor assembly to rotate, and an electronic device coupled to the shaft and positioned in an inner space of the motor assembly, in which the electronic device includes a communication module internetworking with an air conditioning product installed in the room, and a control unit to control the internetworking air conditioning product and the motor assembly.

In addition, the ceiling fan may include a memory unit configured to store data, and a sensing module configured to sense a temperature, a humidity, and a dust amount.

In addition, the control unit may receive room environment information from the internetworking air conditioning product to detect a difference from a user setting condition.

In addition, the control unit may divide a room space based on a user setting condition and room environment information sensed from the internetworking air conditioning product to determine a red zone.

The control unit may control a product, which is positioned in the red zone, of the internetworking air conditioning product such that the red zone is resolved.

In addition, the plurality of blades may include a main blade, and a sub-blade positioned in a space formed inside the main blade.

In addition, the control unit may recognize and control the mutual operating states of the interworking air conditioning products in real time.

In addition, the ceiling fan may include an input/output module to provide an input menu and an output screen to a user.

In addition, the control unit may perform a control operation to manage air in a room by combining information sensed by the sensing module and information received from the interworking air conditioning product.

Further, when some of the interworking air conditioning products is powered off, the control unit may perform a control operation to operate with remaining products which are powered on.

In addition, the electronic device may further include a display cover in which the communication module is installed and a display module installed on the display cover and including a lighting device.

According to another aspect of an embodiment of the present disclosure, A method for controlling a ceiling fan may include inputting an internetworking operation to select an air conditioning product, which is to internetwork through communication connection, of a plurality of air conditioning products installed in a room, determining an operating state of the internetworking air conditioning product, calculating a different between a user setting condition and a room environment using information provided from the internetworking air conditioning product, determining revolutions per minute (RPM) based on the calculated difference, and rotating at the determined RPM.

In addition the determining of the operating state of the internetworking air conditioning product may include receiving information on the user setting condition from the internetworking air conditioning product which is previously operating.

The user setting condition may include at least one of a temperature factor, a factor of a dust amount, a cleanliness factor, or a humidity factor, and the room environment may be determined as having a factor identical to a factor of the user setting condition.

In addition, the information on the room environment is received from the internetworking air conditioning product.

In addition, the calculating of the different between the user setting condition and the room environment further may include determining whether a difference value between the user setting condition and the room environment satisfies a preset range.

The RPM may be stepwise controlled to be matched in the preset range.

The preset range may include a first range defined to have a least difference value, a second range having a size, which is greater than the first range, in the difference value, a third range having a size, which is greater than the second range, in the difference value.

The RPM may include a weak wind matched to the first range, a middle wind matched to the second range, and a strong wind matched to the third range.

In addition, the method may further include determining an operating mode to be identical to an operating mode of the internetworking air conditioning product, and determining a rotational direction of a blade based on at least one of the determined operating mode or the determined RPM.

In addition, the operating mode may include a cooling mode and a warming mode.

In addition, the determining of the rotational direction when the operating mode is determined as the cooling mode may include determining the rotational direction as a counterclockwise direction when the calculated difference value is less than a preset reference, and determining the rotational direction to a clockwise direction when the calculated difference value is greater than the preset reference.

Further, the determining of the rotational direction may include determining the rotational direction to the counterclockwise direction when the operating mode is determined as the warming mode.

The inputting of the internetworking operation further may include selecting a product, which is to internetwork, of a plurality of products displayed on a screen of the input/output module.

In addition, a plurality of air conditioning products displayed on the screen of the input/output module may be registered, by a user, in a server or a router.

In addition, the method for controlling the ceiling fan may further include calculating a difference value between a user setting temperature and a present room temperature for each room space divided based on an installation position of the internetworking air conditioning product, and performing a complementary operation together with the internetworking air conditioning product based on the calculated difference value.

The performing of the complementary operation may include controlling an airflow circulating in the divided room space by changing the RPM of a product, which is disposed in the divided room space, of the internetworking air conditioning products.

The plurality of air conditioning products may include a heater, a fan, an air conditioner, an air purifier, a dehumidifier, a humidifier, and a circulator.

Advantageous Effects

According to an embodiment of the present disclosure, more improved air volume and flow rate may be provided through dual blades when compared to the conventional technology. Accordingly, the sense of comfort of the user may be improved.

In addition, since the reaching range of the airflow is increased, it is possible to minimize or prevent the stagnation of the airflow in a partial room space. In other words, the circulation effect of the air in the room may be relatively improved.

In addition, since the ceiling fan operates by internetworking with another air conditioning product installed in the room, a plurality of air conditioning products may be simultaneously controlled using one control command. In other words, the control operation may be integrally performed, and the room environment setting's may be simply provided.

In addition, room air may be integrally and overall managed. Accordingly, cooling or warming airflow may be uniformly distributed, so the fresh room environment may be formed. Therefore, since the air circulation is effectively performed, the cooling or warming efficiency in the room may be improved.

In addition, since the plurality of air conditioning products internetworking with the ceiling fan commonly follow the room setting temperature, the room environment may be sensed and fedback in the installation position of each product. Accordingly, the time to reach the setting temperature may be reduced and the energy may be saved.

In addition, since the internetworking air conditioning products operate to satisfy the user setting value in each position, the red zone, in which the airflow does not reach, may be minimized when compared to the single operation. In addition, the overall temperature distribution and air quality in the room space may be made to be uniform.

In addition, the cooling or warming in the room space may be more rapidly performed.

In addition, since the ceiling fan internetworks with the plurality of air conditioning products in the room, it is not necessary for the user to individually operate each product. In other words, the user convenience may be improved.

DESCRIPTION OF DRAWINGS

FIG. 6 is a flowchart illustrating a method for controlling a ceiling fan according to a second embodiment of the present disclosure.

FIG. 8 is a view illustrating an airflow direction in the room depending on a rotational direction of a ceiling fan according to an embodiment of the present disclosure.

BEST MODE

[Mode for Invention]

Figure 1:
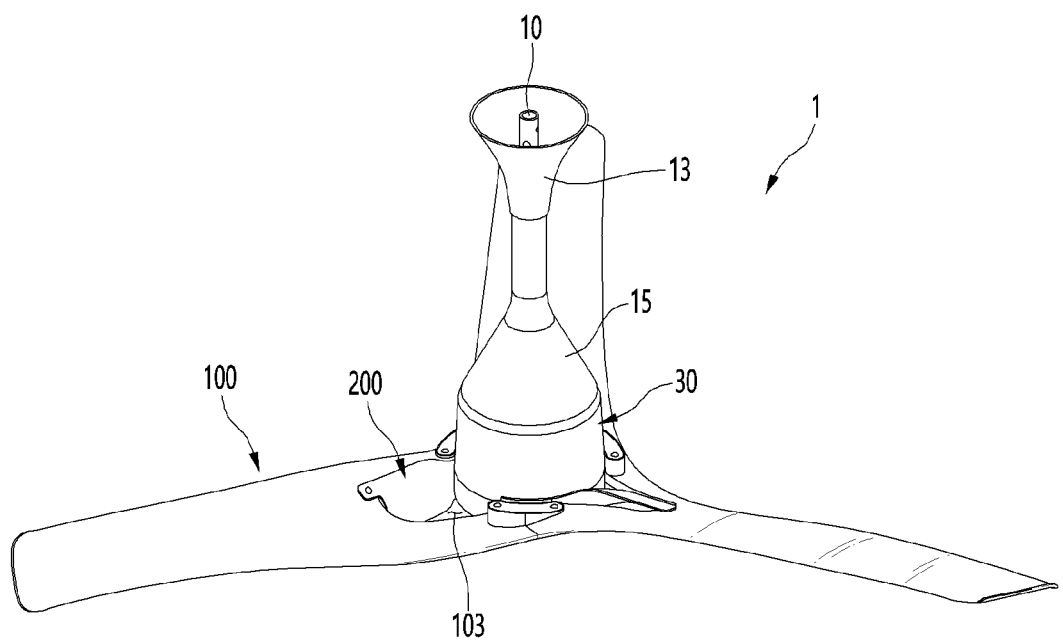
FIG. 1 is a perspective view illustrating a ceiling fan according to an embodiment of the present disclosure.

Hereinafter, some embodiments of the present disclosure will be described in detail with reference to accompanying drawings. In adding the reference numerals to the components of each drawing, it should be noted that the identical or equivalent component is designated by the identical numeral even when they are displayed on other drawings. In addition, in the following description of an embodiment of the present disclosure, a detailed description of well-known features or functions will be ruled out in order not to unnecessarily obscure the gist of the present disclosure.

In addition, in describing the components of the embodiment according to the present disclosure, terms such as first, second, "A", "B", "(a)", "(b)", and the like may be used. These terms are merely intended to distinguish one component from another component, and the terms do not limit the nature, sequence or order of the constituent components. When a certain element is "liked to", "coupled to", or "connected with" another element, the certain element may be directly linked to or connected with the another element, and a third element may be "linked", "coupled", or "connected" between the certain element and the another element.

FIG. 1 is a perspective view illustrating a ceiling fan according to an embodiment of the present disclosure.

Referring to FIG. 1, according to an embodiment of the present disclosure, a ceiling fan 1 may include covers 13, 15, 30, and 90 to form an outer appearance, and a plurality of blades 100 and 200 which are rotatable to force air to flow.

The blades 100 and 200 may include a main blade 100 and a sub-blade 200 positioned in a space formed inside the main blade 100.

The main blade 100 may be formed to extend in a radial direction about the axis of rotation.

In this case, the axis of rotation is the same as the central axis of the covers 13, 15, 30, and 90. In addition, the shafts 10 and 20 to be described below are provided to extend along the central axis of the covers 13, 15, 30, and 90. Accordingly, since the axis of rotation may be understood as being the central axis of the ceiling fan 1, the axis of rotation will be referred to as the central axis below.

In addition, an inner surface of the main blade 100 may be defined as a surface extending toward the central axis. Accordingly, an outer surface of the main blade 100 may be defined as a surface which is opposite to the inner surface and extends in the radial direction.

In other words, the main blade 100 may extend by a specific length in the radial direction perpendicular to the central axis.

The top surface of the main blade 100 forms a negative pressure surface 122 and the bottom surface of the main blade 100 forms a positive pressure surface.

Meanwhile, the front and rear portions may be defined based on forward rotation that the blades 100 and 200 of the ceiling fan 1 rotate clockwise. For example, the main blade 100 has a leading edge formed on a front surface facing the front portion and a trailing edge formed on a rear surface facing the rear portion, when viewed based on the rotational direction.

A plurality of main blades 100 may be provided. In this case, the following description will be made while focusing on the ceiling fan 1 including three main blades 100, according to an embodiment of the present disclosure. In this case, the number of the main blades 100 is not limited thereto.

Inner ends of the main blades 100 may be connected with each other to be in contact with each other. In addition, a space may be formed in be central portion of the plurality of main blades 100. The covers 13, 15, 30, and 90 and the sub-blade 200 may be positioned in the space.

In detail, the main blade 100 may have a blade hole 103 in which the sub-blade 200 is positioned. For example, the blade hole 103 may be formed by cutting away the inner surface of the main blade 100 such that the inner surface is rounded in the radial direction.

In summary, a blade hole 103 is open inside the main blade 100 and in the vertical direction, and the sub-blade 200 may be positioned in the blade hole 103.

A plurality of sub-blades 200 may be provided corresponding to the number of the main blades 100. In this case, the following description of the embodiment of the present disclosure will be made while focusing on the ceiling fan 1 including three sub-blades 200, which is similar to the main blade 100.

The sub-blade 200 may rotate together with the main blade 100. For example, when the main blade 100 rotates clockwise to perform the forward rotation, the sub-blade 200 rotates clockwise together with the main blade 100.

Accordingly, the air in the central portion of the ceiling fan 1 may forcibly flow through the blade hole 103 by the rotation of the sub-blade 200.

The ceiling fan 1 may cause the flow of the air by rotating the dual blades 100 and 200. Accordingly, the air volume and the flow rate provided by the ceiling fan 1 are more increased. In addition, a zone subject to difficult air circulation as an airflow rate is significantly slow in a room space may be minimized.

Hereinafter, the configuration of the ceiling fan 1 according to the embodiment of the present disclosure will be described in detail.

Figure 2:
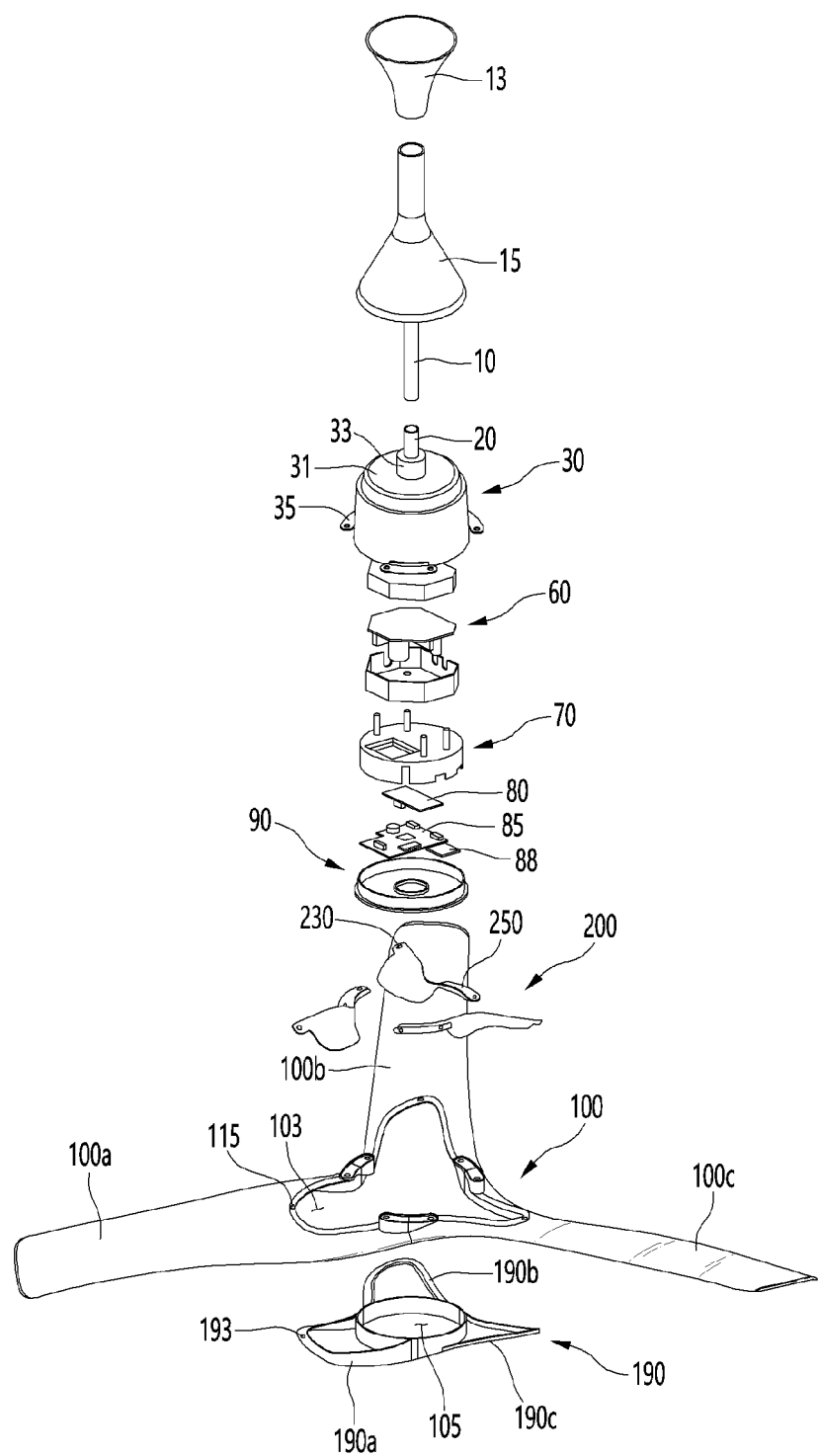
FIG. 2 is an exploded perspective view of the ceiling fan according to an embodiment of the present disclosure.
Figure 3:
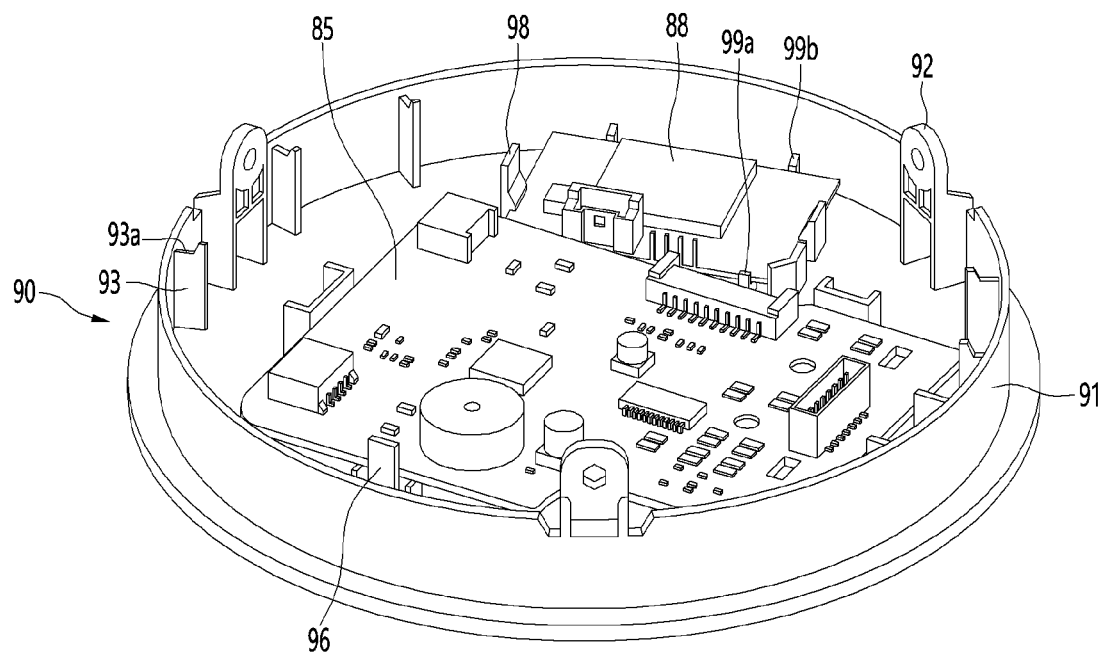
FIG. 3 is a view illustrating a display cover, a display module, and a communication module, which are coupled to each other, according to an embodiment of the present disclosure.

FIG. 2 is an exploded perspective view of the ceiling fan according to an embodiment of the present disclosure. FIG. 3 is a view illustrating a display cover, a display module, and a communication module, which are coupled to each other, according to an embodiment of the present disclosure.

Referring to FIGS. 2 and 3, the ceiling fan 1 according to an embodiment of the present disclosure may include a shaft 10 coupled to a ceiling or wall surface, and an upper cover 13 and a lower cover 15 to cover an outer portion of the shaft 10.

The upper cover 13 and the lower cover 15 may protect the shaft 10 from being exposed to the outside.

An upper end of the upper cover 13 makes contact with the ceiling or the wall surface and a lower end of the upper cover 13 is coupled to an upper end cover of the lower cover 15. For example, the upper cover 13 may be formed in a funnel shape.

The lower cover 15 is coupled to a lower portion of the upper cover 13. In addition, the lower cover 15 may be formed integrally with the upper cover 13.

The upper end of the lower cover 15 may extend in the same direction of the extending direction of the shaft 10. In addition, the lower cover 15 may extend such that the inner diameter of the lower cover 15 is increased downward. For example, the lower cover 15 may be formed in a conical shape.

The lower cover 15 may cover an upper portion of a housing cover 30 to be described below. In addition, the lower cover 15 may be positioned to be spaced apart outward from the housing cover 30 by a predetermined distance.

The shaft 10 may be coupled to the ceiling or wall surface to provide fixing force. For example, the shaft 10 may be coupled to a predetermined coupling device provided on the concrete wall surface of the ceiling. Accordingly, a plurality of components coupled to the lower portion of the shaft 10 may be firmly fixed and supported.

The ceiling fan 1 may further include a motor shaft 20 coupled to the lower end of the shaft 10 and the housing cover 30 to cover an outer portion of the motor shaft 20.

The motor shaft 20 and the shaft 10 may be integrally coupled to each other to form the central axis of the ceiling fan 1. In addition, the motor shaft 20 is coupled to the shaft 10 coupled to the ceiling, so a plurality of components coupled to the motor shaft 20 may be fixed.

The motor shaft 20 passes through the center of the housing cover 30 to extend downward. In other words, the motor shaft 20 may be positioned on the central axis of the housing cover 30.

Meanwhile, the shaft 10 and the motor shaft 20 may be formed integrally with each other, so the shaft 10 and the motor shaft 20 may be collectively referred to as shafts 10 and 20.

The housing cover 30 may form an internal space to receive a plurality of parts therein. The plurality of parts may include a motor assembly 40, a bridge support 50, a control assembly 60, a bridge case 70, and a display cover 90.

The housing cover 30 may have openings extending in a vertical direction. Accordingly, the motor shaft 20 may be positioned to be inserted into the upper portion of the housing cover 30 in the direction of the central axis, and the display cover 90, which is to be described later, may be positioned to be spaced apart inward from the lower end of the housing cover 30 and to face outward.

The housing cover 30 may include a cylindrical shape having upper and lower portions that are open.

The housing cover 30 may extend such that the diameter of the housing cover 30 is increased downward. In other words, an outer circumferential surface of the housing cover 30 may be expanded to the outside downward.

The housing cover 30 may include a blade connector 35 inserted into the main blade 100.

The blade connector 35 may be formed to protrude outward from the outer circumferential surface of the housing cover 30. For example, the blade connector 35 may be formed to extend in a radial direction from the lower end of the housing cover 30.

The blade connector 35 may guide a plurality of main blades 100 such that the plurality of main blades 100 are connected or coupled. To this end, the blade connector 35 may have a plurality of holes.

Alternatively, the blade connector 35 may be formed corresponding to the number of the main blades 100. For example, when three main blades 100 are coupled to each other, three blade connectors 35 may be provided.

In this case, the blade connectors 35 may be formed at angles equal to angles formed among the three main blades 100 about the central axis. In addition, the blade connector 35 is positioned at a point in which the two main blades 100 are coupled to each other, so the blade connector 35 may be inserted into each main blade 100.

The housing cover 30 may be positioned to be spaced downward from the lower end of the lower cover 15 by a specific distance. In addition, the upper end of the housing cover 30 may be formed to have a diameter equal to a diameter of the lower end of the lower cover 15. Accordingly, the lower cover 15 and the housing cover 30 may provide a sense of unity and uniformity in the outer appearance.

In addition, the housing cover 30 may include a cover insertion part 31 spaced apart inward from the lower end of the lower cover 15 by a specific distance. The cover insertion part 31 may constitute the upper portion of the housing cover 30.

The cover insertion part 31 may extend such that the inner diameter of the cover insertion part 31 is reduced upward from the upper end of the housing cover 30. For example, the cover insertion part 31 may be provided in a bowl form.

The cover insertion part 31 has a diameter smaller than the diameter of the upper end of the housing cover 30, so the cover insertion part 31 may be positioned to be inserted into the lower cover 15.

Accordingly, since the housing cover 30 coupled to the blades 100 and 200 is disposed to be spaced apart from the lower cover 15 fixed to the ceiling in the room, the mutual interference caused by the rotation of the blades 100 and 200 may be avoided. In addition, the motor shaft 20 is prevented from being viewed from the outside, thereby providing a simple and neat design of the ceiling fan 1 for a user.

The cover insertion part 31 may include a shaft connection part 33 allowing the motor shaft 20 to pass therethrough and to be positioned.

The shaft connection part 33 may be formed such that the central portion of the cover insertion part 31 extends upward. In addition, the center of the shaft connection part 33 may include a hole to be open in the vertical direction. For example, the cover insertion part 31 may be provided in the form of a ring. Accordingly, the motor shaft 20 may be inserted into the hole and may be positioned on the central axis of the housing cover 30.

The ceiling fan 1 may further include a motor assembly (not illustrated) to provide rotation power to the blades 100 and 200, a bridge support (not illustrated) coupled to the motor shaft 20 to expand a static installation space downward, and a control assembly 60 positioned under the bridge support.

The motor assembly and the bridge support may be positioned in an internal space of the housing cover 30. In addition, the motor assembly and the bridge support may be coupled to the motor shaft 20.

The motor assembly may include an outer type of a motor. Accordingly, a stator of the motor may be coupled to and fixed to the motor shaft 20, and a rotor of the motor may be positioned outside the stator to rotate.

In addition, the housing cover 30 may be coupled to the rotor. Accordingly, the housing cover 30 may rotate together with the rotor.

The motor assembly (not illustrated) and the bridge support positioned under the motor assembly may be disposed in an inner space 37 of the housing cover 30.

The bridge support may be coupled to and fixed to the lower end of the motor shaft 20. The bridge support may include a shaft insertion part to guide the coupling with the motor shaft 20 and a plurality of bridges formed to extend downward from the bottom surface.

The bridge may guide the coupling with the bridge case 70. In addition, the bridge may be inserted into a bridge hole provided in the bridge case 70.

The control assembly 60 may include control cases 61 and 64 and a main PCB 600.

In addition, a plurality of electric components may be installed in the main PCB 600. For example, the main PCB 600 may include a driver IC to control the RPM of the motor, a capacitor, and a power converter.

In other words, the control assembly 60 may perform a function of a control unit 300 of the ceiling fan 1.

In other words, the control assembly 60 may further include a control unit 300.

The control assembly 60 may include an upper control case and a lower control case assembled together in the vertical direction to seal the inner space. The lower control case may be seated on the top surface of the bridge case 70.

The main PCB 600 may be positioned between the upper control case and the lower control.

The ceiling fan 1 may further include a bridge case 70 positioned under the control assembly 60 and a display cover 90 positioned under the bridge case 70.

The bridge case 70 may be coupled to the bridge support and the control assembly 60. Accordingly, the bridge case 70 may be fixed to a lower portion of the control assembly 60 to support the control assembly 60.

The bridge support and the bridge case 70 serve as a bridge to stably fix and link the space in which a plurality of electronic components are installed.

The control assembly 60 may be positioned between the bridge case 70 and the bridge support 50.

The display cover 90 may be coupled to a lower portion of the bridge case 70. In addition, electronic components performing various functions may be disposed in the display cover 90 and the bridge case 70.

The display cover 90 may be positioned at the lowermost central portion of the ceiling fan 1 to form a portion of an outer appearance of the ceiling fan 1.

In addition, the display cover 90 may provide visual information for the user positioned on the ground surface.

The display cover 90 may be positioned at a static position, which may be defined as a non-rotation position, instead of rotating together with the rotation of the blades 100 and 200, so the visibility of the user is improved.

The ceiling fan 1 may include a plurality of electronic components (modules) to provide the convenience of the user.

In detail, the ceiling fan 1 may further include an anti-bug module 80 to eliminate a pest, a display module 85 to perform a lighting function, and a communication module 88 to perform a communication function.

The anti-bug module 80, the display module 85, and the communication module 88 may be positioned in an inner space formed by the display cover 90 and the bridge case 70.

The display module 85 may include a light emitting device (LED) to provide a light and a display PCB to control the light emitting device.

Further the light emitting device may include a light emitting diode (LED).

The display module 85 may be installed in the display cover 90. Accordingly, the display cover 90 may discharge light, which is emitted from the display module 85, to an inner space under the display cover 90.

The communication module 88 may wireless transmit or receive data. For example, the communication module 88 may include Wi-Fi.

The communication module 88 may be connected with various air conditioning products installed in the room space. In addition, the ceiling fan 1 may be synchronized with another air conditioning product installed in the inner space and internetwork with the another air conditioning product to operate in various modes, through the communication module 88.

The display module 38 may be installed in the display cover 90.

The display cover 90 may include a cover extension part 91 extending perpendicularly upward from the lower end thereof.

The cover extension part 91 may extend along the outer circumference of the display cover on that is, in a circumferential direction of the display cover 90. Accordingly, the cover extension part 91 may have an inner space such that a plurality of electronic components are installed in the display cover 90.

The cover extension part 91 may include a coupling guide 92 to guide the coupling to the bridge case 70.

A plurality of main blades 92 may be provided. In addition, the plurality of coupling guides 92 may be positioned at the upper end of the cover extension part 91 while being spaced apart from each other in the circumferential direction. The coupling guide 92 may be inserted into an insertion groove formed in a lower end of the bridge case 70 to guide the coupling.

The display cover 90 may further include a seating guide 98 to seat the bridge case 70.

The seating guide 93 may be formed to protrude inward from the inner circumferential surface of the cover extension part 91. For example, the seating guide 93 may extend toward the center of the display cover 90 from the inner surface of the cover extension part 91.

A plurality of seating guides 93 may be provided. For example, a plurality of the seating guides 93 may be arranged at predetermined intervals in the circumferential direction along the inner circumferential surface of the cover extension part 91.

The seating guide 93 may form a seating groove 93a into which the lower end of the bridge case 70 is inserted.

The display cover 90 may further include a display module coupling device 96 to fix the display module 85.

The display module coupling device 96 may be coupled to the display module 85 through a press-fitting scheme. For example, the display module coupling device 96 may include a snap-fit.

The display cover 90 may further include a communication module coupling device 98 to fix the communication module 88.

The communication module coupling device 98 may be coupled to the communication module 88 through a press-fitting scheme. For example, the communication module coupling device 98 may include a snap-fit.

A pair of communication module coupling devices 98 may be provided to fix an upper end portion and a lower end portion of the communication module 83. The communication module coupling devices 98 may be installed to be elastically deformed.

In addition, the display cover 90 may further include a communication module guide 99a to guide such that the communication module 88 is seated, and a communication module locking part 99b.

The communication module guide 99a and the communication module locking part 99b may be provided such that opposite side end portions of the communication module 88 are seated.

The communication module guide 99a may extend upward from the bottom surface of the display cover 90 such that the one side end portion of the communication module 88 is seated. The communication module guide 99a may be bent in an 'L' shape.

The communication module locking part 99b may extend upward from the bottom surface of the display cover 90 such that the opposite side end portion of the communication module 88 is seated. The communication module locking part 99b may extend in the peripheral direction, that is, a circumferential direction of the display cover 90.

Accordingly, the communication module 88 may be stably seated by the communication module guide 99a and the communication module locking part 99b, and the upper end portion and the lower end portion of the communication module 88 may be firmly fixed by the communication module coupling device 98.

The ceiling fan 1 may further include the main blade 100 and the sub-blade 200 to receive power and to rotate.

A plurality of main blades 100 may be provided. For example, the main blade 100 may include a first main blade 100a, a second main blade 100b, and a third main blade 100c.

The first to third main blades 100a, 100b, and 100c may have the same structure. The first to third main blades 100a, 100b, and 100c may be coupled or assembled together at opposite ends thereof.

The first to third main blades 100a, 100b, and 100c may be coupled to each other to be integrated.

In this case, the central portion of the first to third main blades 100a, 100b, and 100c integrally coupled to each other may have holes 103 and 103 open in the vertical direction. For example, the holes 103 and 105 may include a hole open in the form of a roly-poly.

In addition, the holes 103 and 105 may be divided into a center hole 105, at which the display cover 90 is positioned, and a blade hole 103, at which the sub-blade 200 is positioned, by a decoration cover 190.

The first to third main blades 100a, 100b, and 100c may be arranged to form a specific angle between adjacent main blades based on the central axis while longitudinally extending in the radial direction. For example, the predetermined angle may be 120°.

The main blade 100 may be formed therein with a main coupling hole 115 to be coupled to the sub-blade 200. The main coupling hole 115 may include a hole to be coupled to a coupling member.

The main coupling hole 115 may be positioned in the top surface (negative pressure surface) of the main blade 100. For example, the main coupling hole 115 may be formed in an incision part formed along an inner edge of the main blade 100 adjacent to the blade hole 103.

The main blade 100 may include the decoration cover 190.

The decoration cover 190 may be inserted into the inner surface of the main blade 100. In addition, a plurality of decoration covers 190 may be provided corresponding to the main blade 100. For example, the decoration cover 190 may include a first decoration cover 190a inserted into the first main blade 100a, a second decoration cover 190b inserted into the second main blade 100b, and a third display cover 190c inserted into the third main blade 100c.

The plurality of decoration covers 190 may be coupled to each other while depending on the plurality of main blades 100.

The sub-blade 200 may be positioned in the blade hole 103. In addition, the sub-blade 200 may extend with a predetermined curvature.

In addition, the sub-blade 200 may be arranged to have an inclined angle different from that of the main blade 100. For example, the sub-blade 200 may include an extension surface to guide air to have an angle of attack different from that of the main blade 100

A plurality of sub-blades 200 may be provided corresponding to the number of the main blades 100.

The sub-blade 200 may include a sub-coupling hole 230 to be coupled to the main blade 100 and the decoration cover 190.

When the sub-blade 200 is mounted on the main blade 100, the sub-coupling hole 230 may be positioned corresponding to a main coupling hole 115. Accordingly, a coupling member inserted into the sub-coupling hole 230 may be coupled by passing through both a decoration coupling hole 193 and the main coupling hole 115.

The sub-coupling hole 230 may be formed in one end of the sub-blade 200. In addition, the sub-coupling hole 230 may be formed such that the sub-coupling hole 230 is seated above the main coupling hole 115.

In summary, when the sub-coupling hole 230 is coupled to the main blade 100, the sub-coupling hole 230 may be positioned to be aligned in line with the main coupling hole 115 and the decoration coupling hole 193.

The sub-blade 200 may include a sub-connector 250 to guide the coupling between the plurality of main blades 100.

The sub-blade 200 may be seated on the main blade 100 to correspond to the blade connector 35 in the vertical direction.

The sub-connector 250 may be formed at an opposite end of the sub-blade 200. For example, the sub-connector 250 may extend in the shape corresponding to that of the blade connector 35.

In addition, the sub-connector 250 may be seated at a position at which two main blades 100 are coupled to each other. For example, the sub-connector 250 may be seated at a position at which the first main blade 100a and the second main blade 100b are coupled to each other.

Meanwhile, the control assembly 60, the bridge case 70, the display cover 90, and a plurality of modules 80, 82, and 88 may be defined as an electronic device. In other words, the electronic device may be understood as the feature of the ceiling fan 1 in which a plurality of electronic components are installed.

The electronic device may be positioned in the inner space of the housing cover 30 and may be coupled to the lower portion of the motor shaft 20. Accordingly, the electronic device may be stably fixed by the coupling force transmitted from the ceiling in the room space.

Meanwhile, an outer appearance of the ceiling fan 1 are simple and uniform because the ceiling fan 1 is provided such that only the upper cover 13, the lower cover 15, the housing cover 30, the display cover 90, the main blade 100, and the sub-blade 200 are exposed to the outside, thereby providing the esthetic sense for the user.

Figure 4:
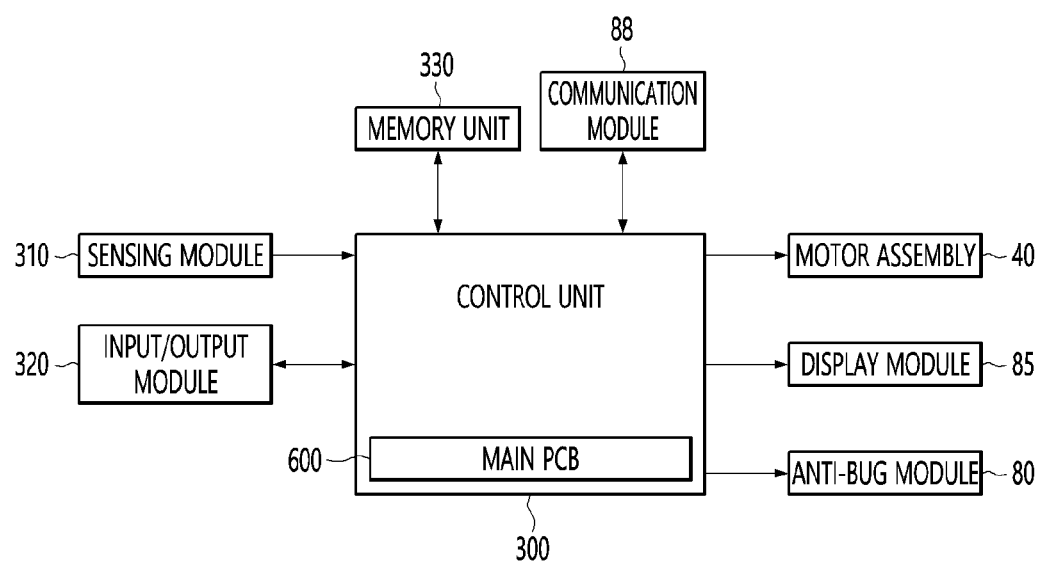
FIG. 4 is a block diagram illustrating the configuration of a ceiling fan according to an embodiment of the present disclosure.

FIG. 4 is a block diagram illustrating the configuration of a ceiling fan according to an embodiment of the present disclosure.

Referring to FIG. 4, the ceiling fan 1 may further include the control unit 300 to control components.

In addition, the control 300 may be provided in the electronic device. For example, the control unit 300 may include the main PCB 60 described above.

The control unit 300 may process data transmitted/received by the communication module 88. In addition, the control unit 300 may make communication with an air conditioning product installed in the same room using the communication module 88.

The communication module 88 may be connected to an external server or a router separately provided.

The server or router may be connected with a plurality of air conditioning products to make communication. In addition, the plurality of air conditioning products may include an air purifier, a humidifier, a dehumidifier, an air conditioner, a fan, or a circulator.

In addition, the air conditioner may include a ceiling type, a stand type, and a wall-mounted type air conditioner.

In addition, the plurality of air conditioning products may be positioned in the room in which the ceiling fan 1 is installed.

Accordingly, the ceiling fan 1 and the plurality of air conditioning products connected with the server or router may make communication with each other. Accordingly, the ceiling fan 1 and the air conditioning product may internetwork with each other.

In other words, the ceiling fan 1 may form a network with the plurality of air conditioning products.

In addition, the control unit 300 may receive information, such as a user setting temperature, a real-time room temperature, or a real-time sensed dust quantity from the plurality of air conditioning products.

Accordingly, even if the user setting temperature is input into any one product, the ceiling ran 1 and the plurality of air conditioning products may set the user setting temperature in common by internetworking with each other.

In this case, the control unit 300 may provide information sensed by the ceiling fan 1 to the air conditioning product.

The control unit 300 may perform a control operation in connection with the motor assembly 40 to control the RPM of the motor.

In addition, the control unit 300 may perform a control operation in connection with the display module 85 to control the lightening brightness or color.

In addition, the control unit 300 may perform a control operation in connection with the anti-bug module 80 to generate an ultrasound for avoiding the pests and to discharge the ultrasound out of the ceiling fan 1.

The ceiling fan 1 may further include a memory unit 330 to store data, a sensing module 310 to sense the environment of the room space, and an input/output module 320 to receive a user command.

The control unit 300 may read data out of the memory unit 330 and may store the processed information.

The sensing module 310 may include a temperature sensor to sense the room temperature, the dust sensor to sense an room dust quantity, and a humidity sensor to sense room humidity.

In this case, information, which may be sensed by the sensing module 310, may be substituted with information sensed by the air conditioning product internetworking with the sensing module 310.

In addition, the control unit 300 may process information sensed by the sensing module 310. For example, the control unit 300 may calculate the difference value between the room temperature and the user setting temperature through the sensing module 310. In addition, the control unit 300 may vary the RPM by operating the motor assembly 40 based on the calculated temperature.

The input/output module 320 may include a portable display device, a smartphone, or a remote control.

In addition, the input/output module 320 may be connected to the above-described server or router. Accordingly, the user may integrally control the ceiling fan 1 and a plurality of air conditioning products internetworking with the ceiling fan 1 using the input/output module 320.

The input/output module 320 may provide an input screen to input a control command of the user. In detail, the user may input a control command into the ceiling fan 1 by selecting a menu displayed through the input screen. In addition, the control command may be applied to a plurality of air conditioning products which internetwork with the ceiling fan 1.

In addition, the input/output module 320 may provide a menu, which is able to be selected by the user such that a plurality of air conditioning products positioned close to the user internetwork with the ceiling fan 1.

In addition, the input/output module 320 may provide, to the user, room environment information, such as a temperature, a humidity, or dust, from the control unit 300 by displaying the environment information.

Meanwhile, the control unit 300 may receive an input command of the user through the input/output module 320. In addition, the control unit 300 may process the input command.

For example, the control unit 300 may process an input command for the operating time of the ceiling fan 1, the user setting temperature, the set air volume, sleep reservation, or the presence of a display.

Figure 5:
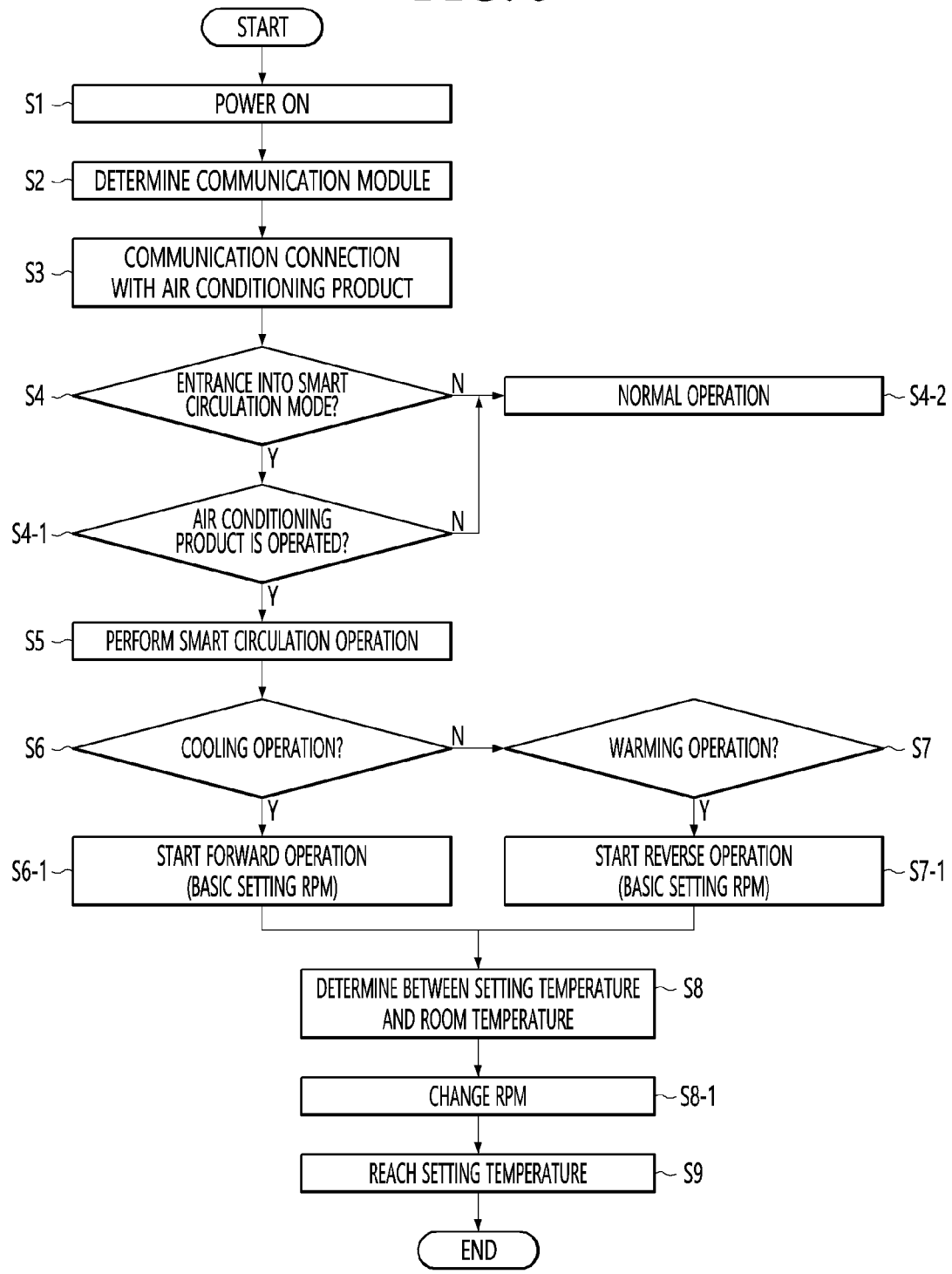
FIG. 5 is a flowchart illustrating a method for controlling a ceiling fan according to a first embodiment of the present disclosure.

FIG. 5 is a flowchart illustrating a method for controlling a ceiling fan according to a first embodiment of the present disclosure.

The ceiling fan 1 may internetwork with a plurality of air conditioning products installed in the room space.

Referring to FIG. 5, the ceiling fan 1 may be powered on depending on the input signal from the user. In other words, the ceiling fan 1 may be in a power-on state (S1).

In addition, the ceiling fan 1 may determine the connection state of the communication module 88 (S2).

For example, the control unit 300 may control the communication module 88 to correctly perform in response to the control command by resetting the communication module 88.

In addition, the ceiling fan 1 may perform a communication connection for internetworking with a plurality of air conditioning products (S3).

The ceiling fan 1 may be synchronized with an air conditioning product connected through the communication connection.

For example, the ceiling fan 1 is connected with another air conditioning product first operating through communication, thereby receiving a control sequence of the internetworking air conditioning product.

In addition, the ceiling fan 1 may determine whether to enter a smart circulation mode (S4).

In detail, when the communication-connection with a plurality of air conditioning products is accomplished, the control unit 300 may determine whether to enter the smart circulation mode, depending on the input signal of a user or the set input state.

For example, when the user inputs the smart mode using the input device using the input/output module 320, the control unit 300 may determine that the entrance into the smart circulation mode is allowed.

To the contrast, the control unit 300 may perform a control operation allowing the ceiling fan 1 to enter into a normal mode, when the entrance into the smart circulation mode is not allowed.

The smart circulation mode may be defined as a mode to recognize the mutual operating state with the air conditioning product internetworking of synchronized through the communication module 88 in real time and to manage the whole air state of the room.

When the ceiling fan 1 enters into the smart circulation mode, the ceiling fan 1 may determine the operating states of the internetworking air conditioning product (S4-1).

In detail, the control unit 300 may receive the information on the operating state of the internetworking air conditioning product to determine the operation of the ceiling fan 1.

For example, the control unit 300 may determine a household appliance whose power is turned off among the internetworking air conditioning products. The control unit 300 may perform a control operation to perform the normal operation depending on the selection of the user when all the internetworking air conditioning products are powered off (S4-2).

In addition, when some of be internetworking air conditioning products are powered off, the control unit 300 may perform be smart circulation module except the powered-off product depending on the selection of the user.

In addition, the ceiling fan 1 may receive the room environment information sensed by the internetworking air conditioning product.

For example, the control unit 300 may receive the sensed room temperature from an air conditioner installed on a sidewall of the room. In this case, it would be obvious that a ceiling-type air conditioner may be sensed as well as a stand-type air conditioner and a wall-mount type air conditioner. In addition, the control unit 300 may receive information on a dust amount or comfort level of a room from an air purifier installed on the ground surface.

In this case, the control unit 300 may compare with the information of the sensing module 310 installed at the peripheral portion of the ceiling to determine the red zone of the room space.

In addition, the control unit 300 may perform a control operation to enhance the circulation of airflow in a position determined as the red zone, while performing the operation based on the smart circulation mode. In this case, the control unit 300 may perform a control operation to change the operating setting of the internetworking air conditioning product together.

In addition, when user setting values of the internetworking air conditioning products are different from each other, the ceiling fan 1 makes the user setting values identical to user setting information input to the ceiling fan 1 to integrally perform the control operation.

In addition, the ceiling fan 1 may perform an operation based on the smart circulation mode (S5).

In the operation based on the smart circulation mode, the warming or cooling operation of the ceiling fan 1 may be determined to determine the rotational directions of the blades 100 and 200 corresponding to the relevant operations (S6 and S7).

For example, when the operation in the smart circulation mode is executed, the ceiling fan 1 may receive the operating mode of the internetworking air conditioning product.

In addition, when the internetworking air conditioning product performs the cooling operation, the ceiling fan 1 determines a mode as a cooling mode (S6). When the internetworking air conditioning product performs the warming operation, the ceiling fan 1 determines the mode as a warming mode (S7).

When the mode is determined as the cooling mode, the ceiling fan 1 may control the blades 100 and 200 to perform a forward rotation. The forward rotation may be defined as rotation that the blades 100 and 200 rotate in a clockwise direction. The forward rotation of the ceiling fan 1 may maximize the cooling effect of the cooling operation (S6-1).

For example, when the internetworking air conditioning product performs the cooling mode, the control unit 300 may recognize that the room space needs to be cooled, and may control the motor assembly 40 to perform the forward operation based on a preset basic RPM.

When the ceiling fan 1 operates in the warming mode, the ceiling fan 1 may control the blades 100 and 200 to perform a reverse rotation. The reverse rotation may be defined as rotation that the blades 100 and 200 rotate in a counter-clockwise direction. The reverse rotation of the ceiling fan 1 may maximize the warming effect of the warming operation (S7-1).

For example, when the internetworking air conditioning product performs the warming, the control unit 300 may recognize that the room space needs to be warmed, and may control the motor assembly 40 to perform the reverse operation based on a preset basic RPM.

In other words, the operation of the ceiling fan 1 may be performed such that the ceiling fan 1 follows the operating modes of the plurality of air conditioning products.

In addition, the ceiling fan 1 may determine the difference between the user setting information and the sensed room information (S8).

In more detail, the control unit 300 may determine the difference value between the room temperature and the user setting temperature with respect to each room space by combining the sensing information of the sensing module 310 of the ceiling fan 1 and the sensing information of the plurality of internetworking air conditioning products.

For example, the control unit 300 may determine the sensing information of the sensing module 310 as the air state of the room ceiling space, and may determine the sensing information received from an air purifier installed on the ground surface as the air state of an room space close to the ground surface. In addition, the control unit 300 may determine the sensing information received the air conditioner mounted on the room sidewall as the air state of the room side space.

In addition, the control unit 300 may calculate the difference value between the user setting value and the sensing value with respect to each section of the room space and may store the calculated value.

The ceiling fan 1 may perform a security operation together with the internetworking air conditioning product using storage information for each room space which is divided.

The ceiling fan 1 may change an RPM of a motor depending on the difference value between the user setting temperature and the present room temperature (S8-1).

For example, when the cooling operation is performed, the ceiling fan 1 may control the room air to rapidly flow by increasing the RPM of the motor when the difference value between the user setting temperature and the present room temperature represents a great value.

In addition, when the difference between the user setting value and the sensed value represents a great value in a specific room space, the ceiling fan 1 may control an air conditioning product, which is closes to the partitioned space, to enhance a cooling or warming intensity, and may maximize the cooling effect by increasing the RPM of the ceiling fan 1.

Thereafter, the ceiling fan 1 may determine whether the value sensed in the room space satisfies the user setting value (S9).

For example, the ceiling fan 1 may determine whether the room temperature satisfies the user setting temperature.

In addition, the ceiling fan 1 may terminate the smart circulation mode when the sensed value in the room space satisfies the user setting value.

Figure 7A:
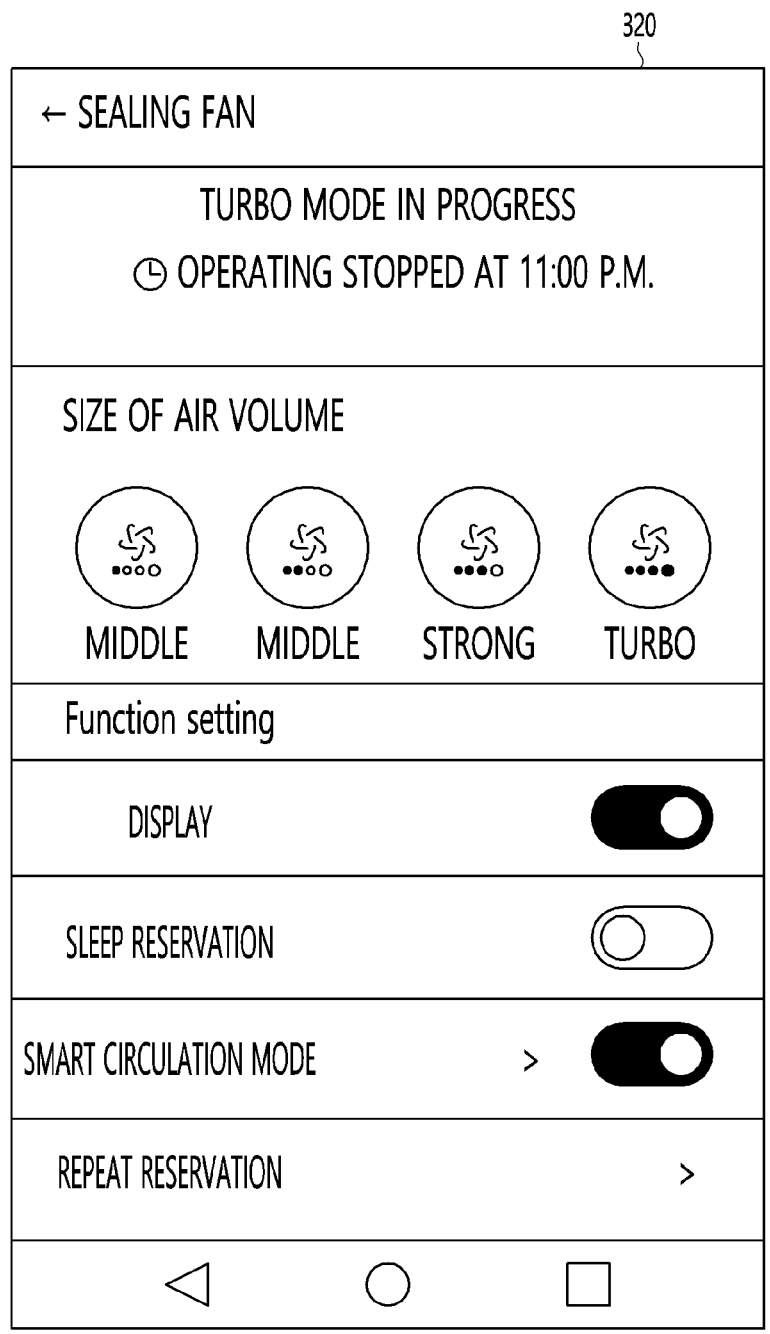
FIGS. 7A to 7C are views illustrating a procedure of inputting an internetworking operation by a user using an input/output module according to a second embodiment of the present disclosure.
Figure 7B:
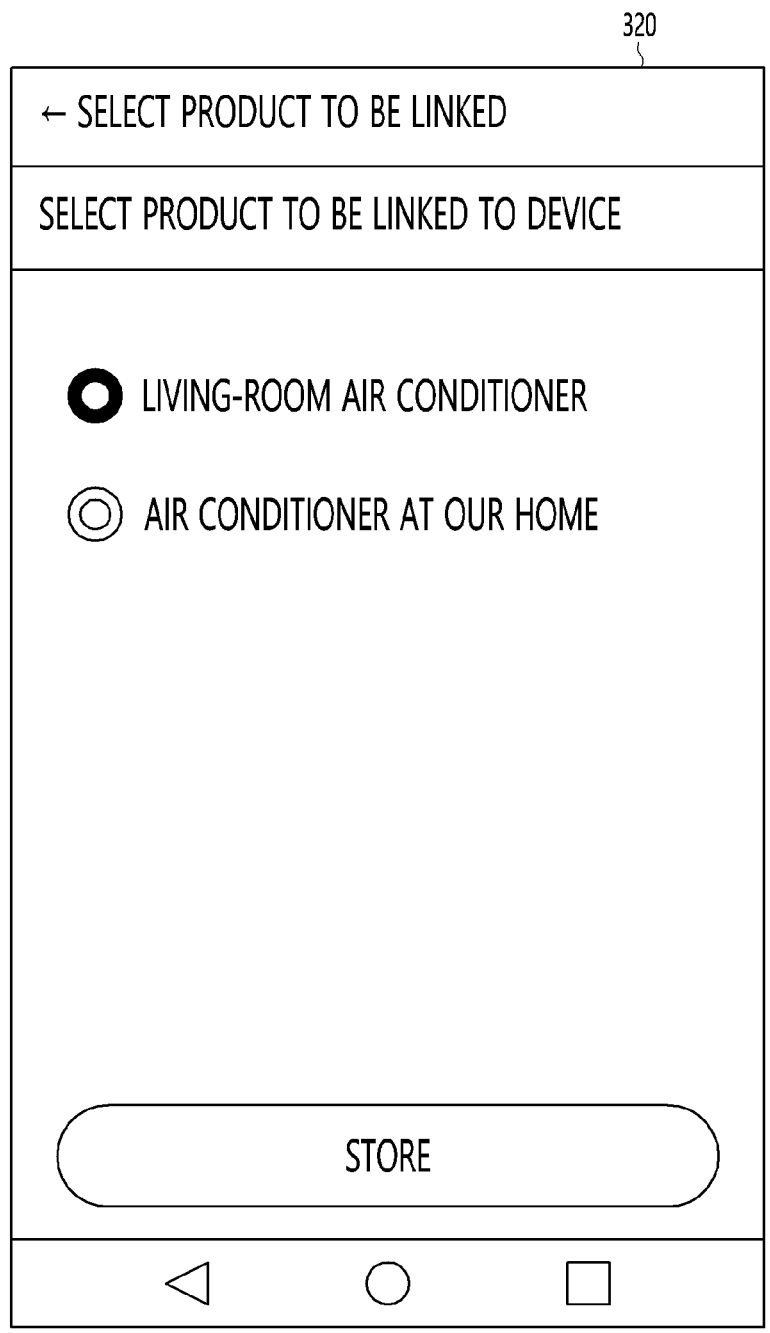
Figure 7C:
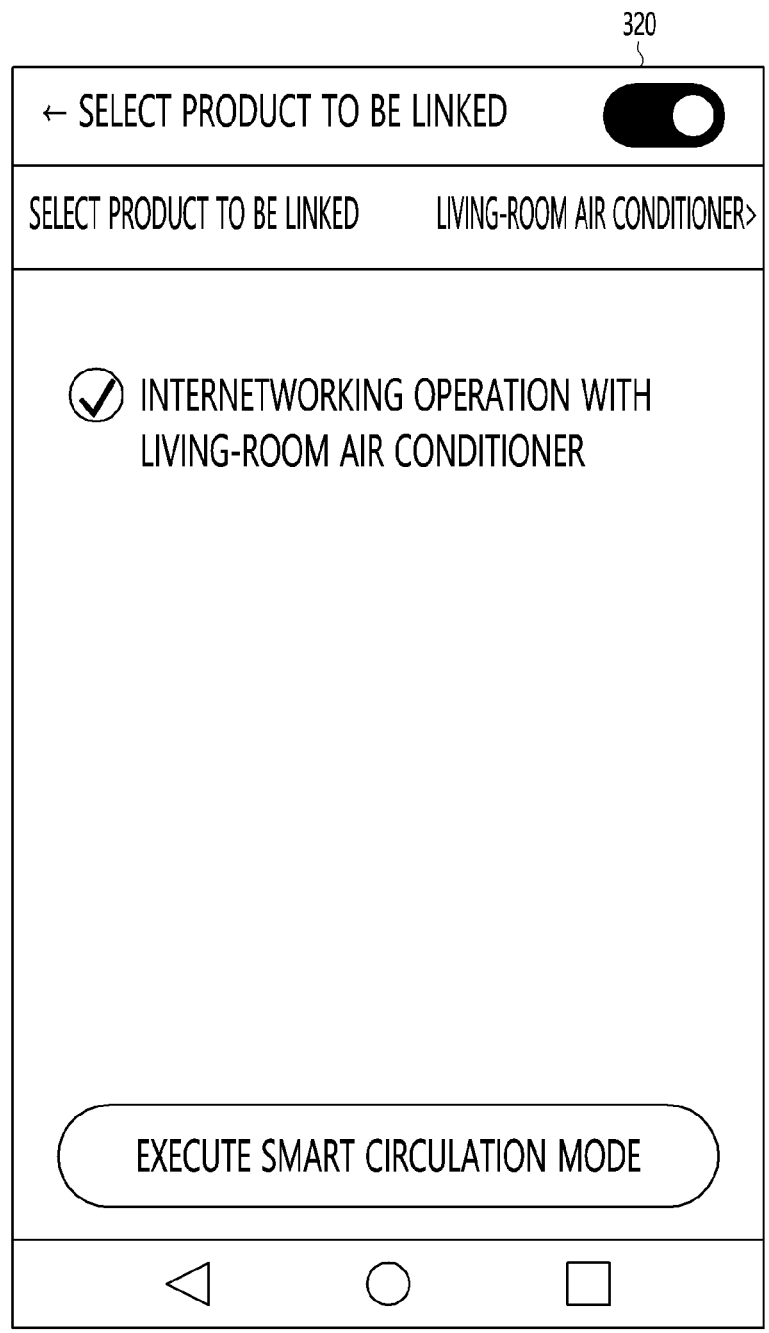

FIG. 6 is a flowchart illustrating a method for controlling a ceiling fan according to a second embodiment of the present disclosure. FIGS. 7A to 7C are views illustrating a procedure of inputting an internetworking operation by a user using an input/output module according to a second embodiment of the present disclosure.

Referring to FIG. 6, the ceiling fan 1 may be powered on. For example, the ceiling fan 1 may be powered on by the user to start operating. In other words, the ceiling fan 1 may be in a power-on state (S10).

When the ceiling fan 1 is powered on, the ceiling fan 1 may determine the connection state of the communication module 88.

For example, the control unit 300 may reset the communication module 88. Accordingly, the control unit 300 may prepare for the communication module 88 such that communication is correctly performed depending on the input command of the user thereafter. In other words, the ceiling fan 1 may perform an initialization procedure.

In addition, the ceiling fan 1 may receive an input of an internetworking operation from the user (S20).

According to the receiving the input of the internetworking operation (S20) may be understood as determining a communication connection state such that a plurality of air conditioning products are simultaneously or integrally controlled through one input/output module 320.

Meanwhile, when the internetworking operation is not input, the ceiling fan 1 may singly operate.

As described above, the plurality of air conditioning products may include a cooling/warming electric appliance connected with the communication module 88. For example, the cooling/warming appliance may include a heater, a fan, and an air conditioner. In addition, the air conditioner may include the ceiling type air conditioner, a stand type air conditioner, and a wall-mounted type air conditioner.

Referring to FIG. 7A, an air volume intensity, a display, sleep reservation, a repeat reservation, and a smart circulation mode menu to control the ceiling fan 1 may be displayed on the screen of the input/output module 320.

In addition, the user may select an icon corresponding to the smart circulation mode to allow the ceiling fan 1 to internetwork with a plurality of air conditioning products. In other words, an internetworking operation of the ceiling fan 1 may be input.

In addition, the control unit 300 may be controlled to receive the internetworking operation input by the user and to switch the output screen of the input/output module 320 to a communication connection screen. In addition, the control unit 300 may sense and align air conditioning products capable of internetworking with the ceiling fan 1.

In addition, the ceiling fan 1 may perform (or complete) a communication connection with the air conditioning product connected to the server (or the router) (S30).

For example, referring to FIG. 7B, the communication connection screen may be output on the screen of the input/output module 320. The list of air conditioning products, which are able to internetwork with the ceiling fan 1, may be displayed on the communication connection screen.

In addition, the user may select a product to be connected to the ceiling fan 1 by touching the screen of be input/output module 320.

The air conditioning product displayed on the communication connection screen, which serves as the product connected with the server (or router) and a product which is able to electrically internetwork with the ceiling fan 1.

For example, the user may dispose an air purifier in a room in which the ceiling fan 1 is placed, and may register the air purifier in the server through input/output module 320, thereby allowing the ceiling fan 1 to internetwork with the air purifier.

For another example, the user registers a living-room air conditioner provided in a living room in which the ceiling fan 1 is installed, thereby allowing the ceiling fan 1 and the air purifier to internetwork with the living-room air conditioner.

The living-room air conditioner may be provided as an air conditioner in any one of a ceiling type, a stand type and a wall mount type.

The control unit 300 may perform communication connection with the selected air conditioning product.

Meanwhile, the ceiling fan 1 may be synchronized with an air conditioning product by performing the communication connection. For another example, the ceiling fan 1 may transmit a control sequence of the living-room air conditioner by performing the communication connection with the living-room air conditioner which is first operated.

Accordingly, the control unit 300 may obtain the room environment information and a user setting condition, which is previously set, from the air conditioning product which is first operated.

After the user selects the air conditioning product, which is able to internetwork, the ceiling fan 1 may complete the communication connection of the selected air conditioning product.

The air conditioning product in which the communication connection is completed may be referred to as "internetworking air conditioning product".

In addition, the ceiling fan 1 may determine the execution of the internetworking operation of the internetworking air conditioning product. In other words, the execution of the smart circulation mode may be determined (S40).

In this case, the smart circulation mode may be defined as a mode to recognize the mutual operating state with the air conditioning product interworking or synchronized through the communication module 88 in real time and to integrally manage the whole air state of the room.

For example, referring to FIG. 7C, an air conditioning product, which is prepared for internetworking-operation as the communication connection is completed, may be displayed on the output screen of the input/output module 320.

In this case, the output screen may show an icon to stop the internetworking with the air conditioning product prepared for the internetworking-operation as the communication connection is completed, an icon to change the air conditioning product to perform the communication connection, and a smart circulation mode icon to start the internetworking-operation with the air conditioning product prepared for the internetworking-operation.

In addition, the user may start the internetworking-operation with the living-room air conditioner together with the ceiling fan 1 by touching the icon to perform the smart circulation mode displayed on the output screen of the input/output module 320.

The control unit 300 may determine whether to perform the smart circulation mode by receiving the input of the user or depending on the set input state. For example, when the user inputs the execution of the smart circulation mode, the control unit 300 may start the smart circulation mode such that the internetworking operation between the ceiling fan 1 and the internetworking air conditioning product is performed.

Meanwhile, the control unit 300 may control the ceiling fan 1 to be in a general mode in which the ceiling fan 1 singly operates when it is determined that the control unit 300 does not enter the smart circulation mode.

When the smart circulation mode is executed, the ceiling fan 1 may determine the operating state of the internetworking air conditioning product (S50).

In detail, the control unit 300 may receive the information on the operating state of the internetworking air conditioning product. In addition, the control unit 300 may determine the operation of the ceiling fan 1 based on information received from the internetworking air conditioning product.

For example, the control unit 300 may determine a product, which is powered off, of the internetworking air conditioning products. In other words, the control unit 300 may determine a product which does not previously operate before the ceiling fan 1 is powered on.

In this case, the control unit 300 may transmit a control command to power on the product powered off such that the operation of the product starts together with the ceiling fan 1.

Meanwhile, the control unit 300 may determine the internetworking air conditioning product which is previously operating before the ceiling fan 1 is powered on. In addition, the control unit 300 may receive the room environment information and/or the user setting condition, which is previously input, from the air conditioning product which is previously operating.

In this case, the room environment information may include a present room temperature, a present room dust amount, a preset room cleanliness, and present room humidity.

In addition, the user setting conditions may include a temperature, a dust amount, cleanliness, or humidity.

The temperature of the user setting condition, which serves as a desired temperature set by the user, may be named a "user setting temperature". Similarly, the dust amount of the user setting condition may be named a "desired dust amount", ad may be expressed using numerical values. In addition, the cleanliness of the user setting condition may be named "desired cleanliness", and may be expressed using a level stepwise.

For example, the control unit 300 may receive the sensed room temperature from an air conditioner installed on a wall surface of the room. In addition, the control unit 300 may receive the present room dust amount, or the present room cleanliness (or comfort) from the air purifier in an upright state installed on the ground surface.

In addition, when the user setting condition stored in the internetworking air conditioning product is different from the user setting condition stored in the ceiling fan 1, the control unit 300 may integrally control the internetworking air conditioning product and the ceiling fan 1 by matching the user setting condition stored in the internetworking air conditioning product to the latest information on the user setting condition input into the ceiling fan 1.

In addition, the ceiling fan 1 may sense or determine the difference between the user setting information and the room environment (S60).

Alternatively, the ceiling fan 1 may calculate the difference between the user setting condition and the room environment.

As described above, the room environment information to determine the user setting condition and/or the present room environment may be received from the air conditioning product determined as first operating in S50.

In addition, the control unit 300 may calculate the difference between the user setting condition and the room environment using the user setting condition and/or the room environment information received from the internetworking air conditioning product.

In addition, when there is absent the air conditioning product, which is first operating, the user setting condition may be directly input by the input/output module 320 of the ceiling fan 1.

In addition, the room environment information may be provided by a sensor (not illustrated) provided in the sensing module 310 and/or the internetworking air conditioning product.

The difference value between the user setting condition and the room environment may be varied depending on the internetworking air conditioning product.

In addition, to sense the difference between the user setting condition and the room environment, factors selected depending on the internetworking air conditioning products may be the same.

For example, when the internetworking air conditioning product is an air conditioner, the user setting condition may be defined as the desired temperature input by the user, that is, the user setting temperature. In this case, the room environment information to determine the room environment may be defined as the present room temperature. In this case, the selected factor is a temperature.

In addition, the air conditioner may include the ceiling type air conditioner, a stand type air conditioner, and a wall-mounted type air conditioner.

Accordingly, when the smart circulation mode is executed as the ceiling fan 1 internetworks with the air conditioner, the control unit 300 may calculate the difference value between the user setting temperature and the present room temperature.

Further, since the control unit 300 may receive the information sensed by the sensing module 310 and the sensing information of the internetworking air conditioning product, the difference value between the user setting temperature and the present room temperature may be calculated with respect to each section of the room space.

In detail, the control unit 300 may recognize the information sensed from the sensing module 310 as the surrounding information of the room ceiling. In addition, the control unit 300 may recognize the information, which is sensed from the air purifier installed on the ground surface, as the surrounding information of the ground surface in the room. In addition, the control unit 300 may recognize the information, which is sensed by the air conditioner installed on the sidewall in the room, as surrounding information of the sidewall in the room. In this case, it may be assumed that the air purifier and the air conditioner have temperature sensors, and internetwork with the ceiling fan 1.

Accordingly, the control unit 300 may divide the room space based on the ceiling, the ground surface, or the sidewall, and the difference value between the user setting temperature and the present room temperature, which is sensed, may be calculated and stored with respect to each divided space.

For another example, when the internetworking air conditioning product is the air purifier, the user setting condition may be defined as the desired dust amount or the desired cleanliness. In this case, the room environment information to determine the room environment may be defined as the present room dust amount or the present room cleanliness.

Accordingly, when the smart circulation mode operates as the ceiling fan 1 and the air purifier internetwork with each other, the control unit 300 may calculate the difference value between the desired dust amount (or the desired cleanliness) and the present room dust amount (or be present room cleanliness).

Meanwhile, it would be obvious that when the internetworking air conditioning products are the air conditioner and the air purifier, the user setting condition is defined as the user setting temperature and the desired dust amount (or the desired cleanliness), to calculate the difference value between room environment information factors.

The ceiling fan 1 may determine whether the difference value ($\Delta T$) between the user setting condition and the room environment satisfy the preset range.

The preset range may be previously stored in the form of a table in the memory unit 330.

The preset range may include a first range, a second range, and a third range.

The first range may be defined such that the difference value ($\Delta T$) has a smaller value. For example, the first range may be defined as $0°$ C.<difference value ($\Delta T$)≤$2°$ C., when the selected factor is the temperature.

The second range may be defined to have a value greater than the first range by the difference value ($\Delta T$). For example, the second range may be defined as $2°$ C.<difference value ($\Delta T$)≤$5°$ C., when the selected factor is the temperature.

The third range may be defined to have a difference value greater than that of the second range. For example, the first range may be defined as $5°$ C.<difference value ($\Delta T$)≤$2°$ C., when the selected factor is the temperature.

The number in the preset range is not limited thereto.

The number in the preset range may correspond to the number of steps divided for each RPM of the ceiling fan 1 to be described later.

The ceiling fan 1 may determine the RPM based on the sensed or determined difference (S60).

In other words, the ceiling fan 1 may determine the RPM based on the calculated difference.

For example, when the difference between the user setting temperature and the current room temperature is relatively large, the ceiling fan may increase the RPM to speed up circulation of room air. In this case, the RPM may be understood as the RPM of the motor described above.

Hereinafter, step S60 will be described in more detail.

The control unit 300 may control the motor based on a previously stored Revolution Per Minute (RPM) to provide the wind strength step by step.

For example, the RPM may be defined as "weak", "medium", or "strong". In addition, the RPM for "weak", "medium", and "strong" may be previously stored in the memory unit 330 such that the wind strength is divided step by step.

In addition, the preset setting range may be stored in match to the RPM which is previously stored.

In detail, when the difference value ($\Delta T$) satisfies the first range, the RPM is determined as corresponding to (matched to) "weak" or "weak wind". When the difference value ($\Delta T$) satisfies the second range, the RPM is determined as corresponding to (matched to) "middle" or "middle wind". When the difference value ($\Delta T$) satisfies the third range, the RPM may be determined as corresponding to (matched to) "strong" or "strong wind".

The RPM may be increased toward "strong wind" from "weak wind".

For example, when the selected factor is the temperature, and when the difference value is $2°$ C., the difference value satisfies the first range. Accordingly, the control unit 300 may control the RPM to "weak" corresponding to the first range.

The RPM divided into "weak", "middle", and "strong" step by step may be understood as room airflow desired and expected by the user.

In other words, when the difference value satisfies the third range, it may be understood as that the user expects a stronger and direct airflow. Accordingly, in this case, the control unit 300 may control the RPM to "strong".

In other words, when the difference value satisfies the second range, it may be understood as that the user expects a direct airflow which is not strong. Accordingly, in this case, the control unit 300 may control the RPM to "middle".

In addition, when the difference value satisfies the first range, it may be understood as that the user expects a smooth airflow. Accordingly, in this case, the control unit 300 may control the RPM to "weak".

Meanwhile, as described above, when the difference value between the user setting temperature and the preset room temperature is stored, the ceiling fan 1 may control the RPM using information stored for each divided space.

In other words, the ceiling fan 1 may perform a complementary operation for each of the divided spaces together with the internetworking air conditioning product.

For example, when the difference value between the user setting temperature and the preset room temperature is greater than a preset reference in one divided space, the control unit 300 may increase the RPM of the air conditioning product placed in the one divided space or closes to the one divided space, thereby controlling the airflow, which circulates the one divided space, to be strong. Simultaneously, the control unit 300 may maximize the effect by increasing even the RPM of the ceiling fan 1.

In addition, the ceiling fan 1 may determine an operating mode (S70).

The operating mode may include cooling and warming.

The operating mode may be directly input by the user through the input/output module 320. In addition, as described above in step S50, the operating mode information of the internetworking air conditioning product may be received and determined.

For example, when the internetworking air conditioning product performs the cooling mode, the control unit 300 may determine the operating mode to the cooling mode. When the internetworking air conditioning product performs the warming mode, the control unit 300 may determine the operating mode to the warming mode. In other words, the ceiling fan 1 may operate to follow the operating mode of the internetworking air conditioning product.

In this case, the control unit 300 may automatically determine the cooling mode or the warming mode based on information sensed by the sensing module 310.

Meanwhile, the control unit 300 may determine the operating mode to an Auto mode, when the cooling or warming operation is not provided for the internetworking air conditioning product. For example, when the internetworking air conditioning product is an air purifier, the control unit 300 may determine the operating mode to the Auto mode.

The Auto mode is defined as an operating mode to control the rotational direction of the ceiling fan 1, which is to be described later, depending on whether the preset room temperature is higher (+) than or lower than (−) the user setting temperature.

For example, in the Auto mode, the ceiling fan 1 is rotated in the forward direction when the preset room temperature is higher than the user setting temperature, and rotated in the reverse direction when the preset room temperature is lower than the user setting temperature.

In addition, the ceiling fan 1 may determine the rotational direction based on the determined operating mode and the determined RPM (S75).

In other words, since the determined RPM corresponds to the setting range to which the calculated difference value belongs, the ceiling fan 1 may determine the rotational direction based on the determined operating mode and the calculated difference value.

In detail, when the determined operating mode is the cooling mode, the ceiling fan 1 may perform the forward rotation when the determined RPM satisfies "strong" or "middle".

In other words, when the difference value (ΔT) satisfies the second range or the third range, and when the operating mode is determined to the cooling mode, the control unit 300 may control the blades 100 and 200 to rotate in the forward direction.

The forward rotation may be determined as that the blades 100 and 200 rotate clockwise (see FIG. 8).

In this case, the forward rotation of the ceiling fan 1 may maximize the room cooling effect based on the cooling mode. The details thereof will be described below with reference to FIG. 7.

In other words, when the difference value (ΔT) satisfies the first range, and when the operating mode is determined to the cooling mode, the control unit 300 may control the blades 100 and 200 to rotate in the reverse direction.

The reverse rotation may be determined as that the blades 100 and 200 rotate counterclockwise (see FIG. 7).

In summary, when the calculated difference value (ΔT) is less than the preset reference value (for example, the maximum value of the first range) in the cooling mode, the control unit 300 may control the blades 100 and 200 to rotate in the reverse direction.

Meanwhile, when the calculated difference value (ΔT) is greater than the preset reference value, the control unit 300 may control the blades 100 and 200 to rotate in the forward direction.

Meanwhile, when the RPM is weak in spite of the cooling mode, it may be understood that the user expects a mild cooling airflow as described above.

To satisfy this, the rotational direction may be determined to the reverse direction instead of the forward direction to optimize the cooling effect, when the difference between the user setting temperature and the preset room temperature is in the first range which is smaller.

Meanwhile, when the determined operating mode is the warming mode, the ceiling fan 1 may perform the rotation in the reverse direction.

In other words, when the operating mode is determined to the warming mode, the control unit 300 may control the blades 100 and 200 to rotate in the reverse direction regardless of the RPM.

In this case, the reverse rotation of the ceiling fan 1 may maximize the warming effect of the warming operation. The details thereof will be described with reference to FIG. 7.

Meanwhile, as described above, when the determined operating mode is the Auto mode, the ceiling fan 1 may determine the rotational direction based on the difference between the user setting temperature and the preset room temperature.

In detail, the control unit 300 may rotate the ceiling fan 1 in the forward direction such that a downward airflow is formed in the center when the preset room temperature is higher (+) than the user setting temperature, and may rotate the ceiling fan 1 in the reverse direction when the preset room temperature is lower (−) than the user setting temperature such that an upward airflow is formed in the center.

In addition, the ceiling fan 1 may rotate with the determined RPM and in be determined rotational direction (S80).

Accordingly, the ceiling fan 1 and the internetworking air conditioning product operate to satisfy a common user setting condition together to rapidly reach the user setting condition. In other words, the room comfort may be more rapidly improved, and redundant energy consumption may be reduced. In addition, the user control convenience may be improved through integrated control.

Thereafter, the ceiling fan 1 may determine whether the room environment satisfies the user setting value (S85)

In detail, the control unit 300 may determine whether information on the present room environment satisfies the user setting condition after a specific time is elapsed. In other words, the control unit 300 may update the information on the room environment in real time from at least any one of the sensing module 310 and the sensor of the internetworking air conditioning product.

For example, after the specific time is elapsed, the control unit 300 may determine whether the sensed preset room temperature satisfies the user setting temperature.

In addition, the ceiling fan 1 may terminate the smart circulation mode when the room environment satisfies the user setting value.

Meanwhile, when the room environment fails to satisfy the user setting condition, the ceiling fan 1 may change the RPM (S90).

For example, when it is determined that the preset room temperature fails to reach the user setting temperature in S85, the control unit 300 may perform a control operation to increase the RPM such that the preset room temperature more rapidly the user setting temperature.

In other words, the control unit 300 may perform the control operation such that the RPM is increased to one step from "weak" to "middle" or from "middle" to "strong".

Hereinafter, another embodiment is suggested.

In detail, the step S60 of sensing the difference between the user setting condition and the room environment further includes the red zone in the room space, In detail, the control unit 300 may determine the red zone of the room space by comparing the sensing information of the sensing module 310 installed in the ceiling fan 1 with the information on the room environment provided from the internetworking air conditioning product.

In this case, the red zone may be defined as an area degraded in dust suction effect, an area which cold air or warm air does not reach, and an area which airflow is stagnant.

In addition, the step S60 of sensing the difference between the user setting condition and the room environment may further include controlling the ceiling fan 1 and the internetworking air conditioning product to resolve the determined red zone.

For example, the control unit 300 may control the rotational speed of the ceiling fan 1 to be increased, and may control an air volume of an air conditioner of the internetworking air conditioning product and a suction amount of the air purifier of the internetworking air conditioning product to increase such that the airflow circulation enhanced in the determined red zone.

Accordingly, the red zone in the room may be minimized and the room air conditioning may be effectively realized.

FIG. 8 is a view illustrating an airflow direction in the room depending on the rotational direction of the ceiling fan, according to an embodiment of the present disclosure.

In general, it is advantageous that the ceiling fan 1 performs the rotation R in the forward direction when it is determined that the cooling is required in the room space. In addition, it is advantageous that the ceiling fan 1 performs the rotation R' in the reverse direction when it is determined that the warming is required in the room space. Accordingly, the cooling or warming effect may be maximized.

Referring to FIG. 8, regarding the airflow direction in the room space when the ceiling fan 1 performs forward rotation in a clockwise direction R, the downward flow may be formed toward the center of the ceiling fan 1, and the upward flow may be formed away from the center of the ceiling fan 1.

In other words, when the ceiling fan 1 performs forward rotation, the air at the peripheral portion of the ceiling fan 1 is pushed downward by the blades 100 and 200. The air at the peripheral portion of the room sidewall, which is away from the ceiling fan 1, may ascend by the flow of air introduced from the lower portion of the room and may flow toward the center of the ceiling fan 1 having negative pressure (C).

Accordingly, when a cooling mode is performed, and the ceiling fan 1 performs the forward rotation, the hot air in the lower portion of the room may be circulated to the outside such that the cooling effect is maximized.

Meanwhile, when a warming mode is performed, since the room temperature is substantially lowered, the warm air discharged through the air conditioning product may naturally form an upward airflow due to the temperature difference.

Accordingly, the ceiling fan 1 may perform the reverse rotation R' in the warming mode. According to the reverse rotation R', as the blades 100 and 200 rotate, air forcibly flows such that the air at the peripheral portion of the center of the ceiling fan 1 ascends upward in the room. Accordingly, the downward airflow may be formed on the sidewall in the room.

Accordingly, the ceiling fan 1 may prevent warm air, which is discharged from another air conditioning product, from being concentrated on the peripheral portion of the ceiling fan 1 due to the lower room temperature, and may forcibly circulate the air, which is positioned at the peripheral portion of the ceiling fan 1, downward the room. Accordingly, the warming effect may be maximized.

Figure 9:
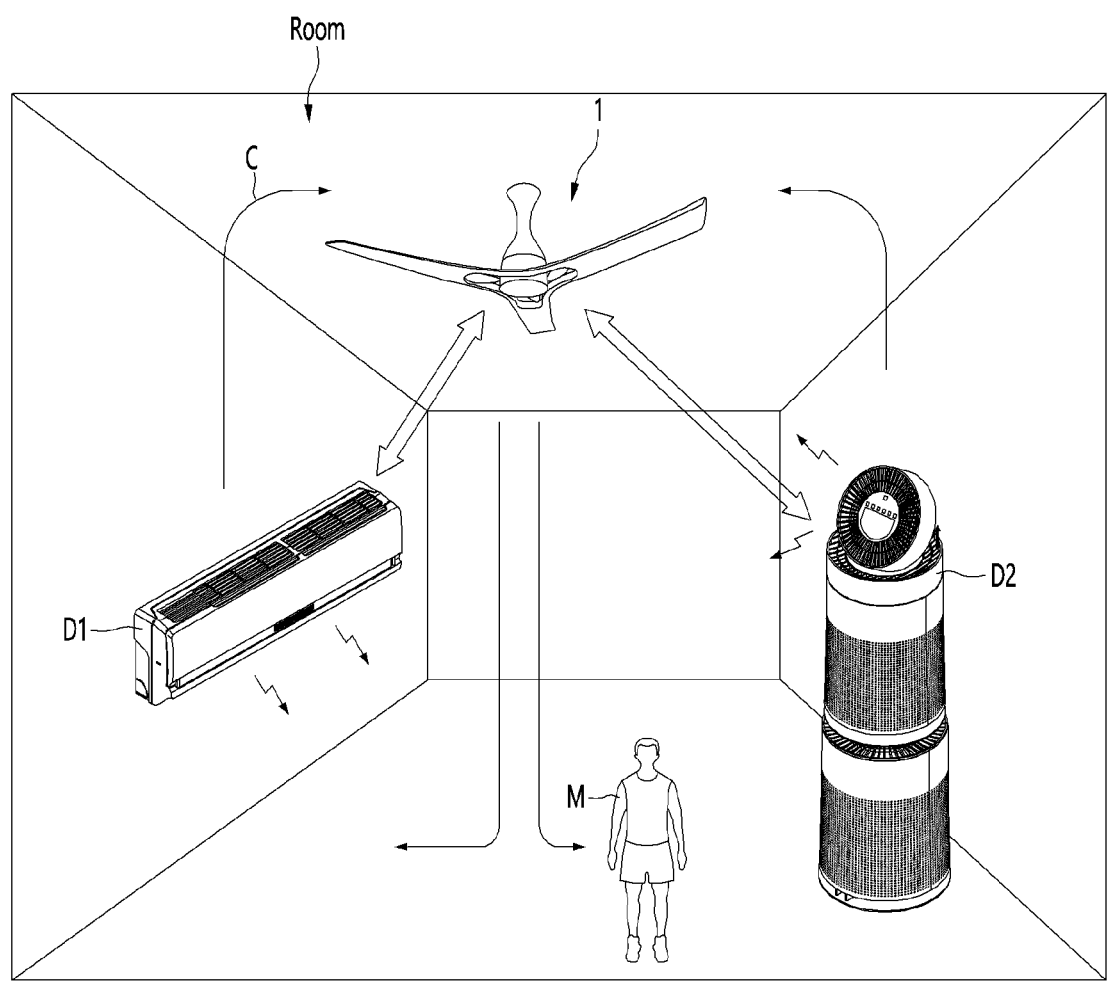
FIG. 9 is a schematic view illustrating the integral management of room air as a ceiling fan internetworks with a plurality of air conditioning products according to an embodiment of the present disclosure.

FIG. 9 is a schematic view illustrating the integral management of room air as a ceiling fan internetworks with a plurality of air conditioning products according to an embodiment of the present disclosure.

Referring to FIG. 9, various air conditioning products may be installed in the room. In addition, the air conditioning products may be installed at different positions.

The plurality of air conditioning products may include an air conditioner, an air purifier, a humidifier, a dehumidifier, a fan, a circulator, or a warm device.

For example, the ceiling fan 1 may be installed on the ceiling of the room. In addition, a plurality of air conditioning products may be installed at mutually different positions in the room.

In detail, a wall-mounted air conditioner D1 may be installed on the room sidewall. In addition, an air purifier D2 or a humidifier may be installed in the upright state on the ground surface in another room space.

Meanwhile, as described above, the ceiling fan 1 may operate while internetworking with at least one of the air conditioner D1, the air purifier D2, and the humidifier, In this case, the ceiling fan 1, the air conditioner D1, and the air purifier D2 may share an room air environment set by a user.

The ceiling fan 1 may internetwork with a plurality of air conditioning products, which are installed in the room space, while constructing a network. In addition, the air conditioning products belong to the network may be integrally operated with the same user setting value.

In other words, all air conditioning products installed in the room space internetwork with each other such that the room air conditioning environment may be integrally controlled.

Accordingly, since air conditioning products operate on the room ceiling, room wall surface, or the ground surface, the room air circulation is rapidly performed, such that the cooling effect or the warming effect may be improved.

In other words, the room temperature may rapidly reach the setting temperature, and time for the air purifying is reduced, depending on the cooling mode or the warming mode. Accordingly, a user M may rapidly feel freshness for the room air environment.

In addition, a dust amount, or a temperature is sensed at a position in which each air conditioning product is installed, and an operation is performed to reach the user setting value. Accordingly, the red zone in the room is removed, and the uniform room air environment may be totally made.

The invention claimed is:

1. A ceiling fan comprising:
a shaft to couple to a ceiling or a wall surface in a room;
a motor assembly connected with the shaft to provide rotational power;
a plurality of blades coupled to the motor assembly to rotate; and
an electronic device coupled to the shaft and positioned in an inner space of the motor assembly,
wherein the electronic device includes:
a communication module to communicate with an internetworking air conditioning product installed in the room; and
a controller configured to control the internetworking air conditioning product and the motor assembly,
wherein the controller is configured to:
divide a room space based on a user setting condition and room environment information received from one or more internetworking air conditioning products to determine a red zone; and control an internetworking air conditioning product from among the one or more internetworking air conditioning products, which is positioned in the red zone, to resolve the red zone, and wherein the red zone is defined as an area degraded in dust suction effect, an area in which cold air or warm air does not reach, and an area in which airflow is stagnant.

2. The ceiling fan of claim 1, further comprising:
a memory to store data; and
a sensing module to sense a temperature, a humidity, and a dust amount.

3. The ceiling fan of claim 1, wherein the controller is configured to:
receive room environment information from the internetworking air conditioning product, and detect a difference from a user setting condition using the room environment information.

4. The ceiling fan of claim 1, wherein the controller is configured to:
determine and control mutual operating states with the internetworking air conditioning product in real time.

5. The ceiling fan of claim 1, further comprising:
an input/output module to provide an input menu and an output screen to a user.

6. A method for controlling a ceiling fan, the method comprising:
receiving an input of an operation to select an internetworking air conditioning product, which is to work with the ceiling fan through a communication connection, among a plurality of air conditioning products installed in a room;
determining an operating state of the internetworking air conditioning product;
calculating a difference between a user setting condition and a room environment using information provided from the internetworking air conditioning product;
determining revolutions per minute (RPM) based on the calculated difference; and
rotating blades of the ceiling fan at the determined RPM,
wherein the calculating of the difference between the user setting condition and the room environment includes:
dividing a room space based on a user setting condition and room environment information received from one or more internetworking air conditioning products to determine a red zone; and
controlling an internetworking air conditioning product from among the one or more internetworking air conditioning products, which is positioned in the red zone, to resolve the red zone, and
wherein the red zone is defined as an area degraded in dust suction effect, an area in which cold air or warm air does not reach, and an area in which airflow is stagnant.

7. The method of claim 6, wherein the determining of the operating state of the internetworking air conditioning product includes:
receiving information on the user setting condition from the internetworking air conditioning product which is operating prior to the ceiling fan receiving the input of the operation.

8. The method of claim 7, wherein the user setting condition includes:
at least one of a temperature factor, a factor of a dust amount, a cleanliness factor, or a humidity factor, and
wherein the room environment is determined based on at least one factor identical to at least one factor of the user setting condition.

9. The method of claim 7, wherein information on the room environment is received from the internetworking air conditioning product.

10. The method of claim 7, wherein the calculating of the difference between the user setting condition and the room environment further includes:
determining whether a difference value between the user setting condition and the room environment satisfies a preset range, and
controlling the RPM of the blades of the ceiling fan to match with the preset range.

11. The method of claim 10, wherein the preset range includes:
a first range of the difference value;
a second range of the difference value, which is greater than the first range;
a third range of the difference value, which is greater than the second range, and
wherein the RPM of the blades of the ceiling fan includes:
the RPM generating a weak wind matched to the first range of the difference value;
the RPM generating a middle wind stronger than the weak wind matched to the second range of the difference value; and
the RPM generating a strong wind stronger than the middle wind matched to the third range of the difference value.

12. The method of claim 6, further comprising:
determining an operating mode to be identical to an operating mode of the internetworking air conditioning product; and
determining a rotational direction of the blades based on at least one of the determined operating mode or the determined RPM.

13. The method of claim 12, wherein the operating mode includes:
a cooling mode and a warming mode, and
wherein the determining of the rotational direction when the operating mode is determined as the cooling mode includes:
determining the rotational direction as a counterclockwise direction when the calculated difference value is less than a preset reference; and
determining the rotational direction as a clockwise direction when the calculated difference value is greater than the preset reference.

14. The method of claim 13, wherein the determining of the rotational direction includes:
determining the rotational direction as the counterclockwise direction when the operating mode is determined as the warming mode.

15. The method of claim 6, further comprises inputting of the operation in an input/output module, the inputting of the operation including:
selecting the internetworking air conditioning product among the plurality of internetworking air conditioning products displayed on a screen of the input/output module, and
wherein the plurality of air conditioning products displayed on the screen of the input/output module are registered in a server.

16. The method of claim 6, further comprising:
calculating a difference value between a user setting temperature and a present room temperature for a room space divided based on an installation position of the internetworking air conditioning product; and performing a complementary operation together with the internetworking air conditioning product based on the calculated difference value.

17. The method of claim 16, wherein the performing of the complementary operation includes:

controlling an airflow circulating in the divided room space by changing an RPM of the internetworking air conditioning product, which is disposed in the divided room space.

18. The method of claim 7 wherein the air conditioning product is one of a heater, a fan, an air conditioner, an air purifier, a dehumidifier, a humidifier, and a circulator.

* * * * *